(12) United States Patent
Goldfine

(10) Patent No.: US 6,969,548 B1
(45) Date of Patent: Nov. 29, 2005

(54) IMPACT ABSORBING COMPOSITE

(76) Inventor: Andrew A. Goldfine, 1730 E. Second St., Duluth, MN (US) 55812

( * ) Notice: Subject to any disclaimer, the term of this patent is extended or adjusted under 35 U.S.C. 154(b) by 260 days.

(21) Appl. No.: 09/787,497

(22) PCT Filed: Aug. 25, 2000

(86) PCT No.: PCT/US00/23519

§ 371 (c)(1),
(2), (4) Date: Mar. 16, 2001

(87) PCT Pub. No.: WO01/15892

PCT Pub. Date: Mar. 8, 2001

Related U.S. Application Data

(60) Provisional application No. 60/151,448, filed on Aug. 30, 1999.

(51) Int. Cl.⁷ .......................... B32B 3/16; B29C 67/20; B29C 44/12
(52) U.S. Cl. ...................... 428/159; 428/158; 428/160; 428/167; 428/138; 428/137; 428/140; 428/139; 206/814; 206/523; 264/46.4; 264/46.7; 264/273; 264/257
(58) Field of Search ................ 428/167, 138, 428/139, 160, 137; 156/242; 206/814, 523; 264/46.4, 273, 257, 46.7

(56) References Cited

U.S. PATENT DOCUMENTS

| | | | |
|---|---|---|---|
| 325,785 A | 9/1885 | Butterfield | |
| 2,785,739 A * | 3/1957 | McGregor, Jr. et al. | 267/145 |
| 3,016,317 A | 1/1962 | Brunner | 154/49 |
| 3,258,791 A * | 7/1966 | Kaplan | 5/736 |
| 3,285,768 A | 11/1966 | Habib | 117/11 |
| 3,285,800 A | 11/1966 | Bartell et al. | 161/123 |
| 3,512,190 A * | 5/1970 | Buff | 5/730 |
| 3,546,055 A * | 12/1970 | Spertus | 428/52 |
| 3,577,836 A | 5/1971 | Tamura | 2/2.5 |
| 3,620,870 A | 11/1971 | Maistre | 156/197 |
| 3,746,605 A | 7/1973 | Dillon et al. | 161/122 |
| 3,770,117 A | 11/1973 | Brewer, Jr. | 206/46 FC |
| 3,816,234 A | 6/1974 | Winfield | 161/160 |
| 3,840,269 A * | 10/1974 | Ambrose | 297/452.56 |
| 3,878,561 A | 4/1975 | Winiecki | 2/2 |
| 3,961,001 A * | 6/1976 | Bethe | 264/46.4 |
| 4,051,555 A | 10/1977 | Daly | 2/412 |
| 4,085,176 A * | 4/1978 | Nakayama | 246/82 |
| 4,138,283 A * | 2/1979 | Hanusa | 156/77 |
| 4,250,578 A | 2/1981 | Barlow | 2/24 |
| 4,263,247 A | 4/1981 | Berger et al. | 264/273 |
| 4,343,047 A | 8/1982 | Lazowski et al. | 2/411 |
| RE31,328 E | 8/1983 | Anderson et al. | 160/354 |
| 4,422,183 A | 12/1983 | Landi et al. | 2/2 |
| 4,485,919 A * | 12/1984 | Sandel | 206/370 |
| 4,507,801 A | 4/1985 | Kavanagh et al. | 2/2 |
| 4,579,701 A | 4/1986 | Park et al. | 264/53 |
| 4,615,562 A | 10/1986 | Bell et al. | 297/250 |
| 4,884,295 A | 12/1989 | Cox | 2/2 |
| 4,887,811 A | 12/1989 | Tresh | 272/56.5 R |
| 4,991,230 A | 2/1991 | Vacanti | 2/2 |

(Continued)

OTHER PUBLICATIONS

"Styropor® P" Product Information; BASF Aktiengesellschaft; 1999; 1 page.

(Continued)

Primary Examiner—William P. Watkins, III
(74) Attorney, Agent, or Firm—Kinney & Lange, P.A.

(57) ABSTRACT

An impact absorbing composite structure (10), the impact absorbing composite structure including a plurality of impact absorbing members (18) and a flexible layer (16), each impact absorbing member (18) integral with the flexible layer (16).

35 Claims, 6 Drawing Sheets

U.S. PATENT DOCUMENTS

| | | | | |
|---|---|---|---|---|
| 5,023,958 A | | 6/1991 | Rotzin | 2/411 |
| 5,073,986 A | | 12/1991 | Farrago | 2/22 |
| 5,088,130 A | | 2/1992 | Chiarella | 2/411 |
| 5,110,653 A | | 5/1992 | Landi | 426/116 |
| 5,127,105 A | | 7/1992 | Sacks | 2/2.5 |
| 5,160,785 A | * | 11/1992 | Davidson, Jr. | 428/316.6 |
| 5,200,261 A | | 4/1993 | Taguchi et al. | 428/245 |
| 5,225,812 A | | 7/1993 | Faghri | 340/605 |
| 5,238,228 A | | 8/1993 | Moon | 256/13.1 |
| 5,251,414 A | | 10/1993 | Duke | 52/309.16 |
| 5,295,883 A | | 3/1994 | Moran | 441/65 |
| 5,322,181 A | * | 6/1994 | Nelson | 229/87.2 |
| 5,351,341 A | | 10/1994 | Broersma | 2/412 |
| 5,403,642 A | | 4/1995 | Landi et al. | 428/116 |
| 5,426,786 A | | 6/1995 | Calvin | 2/2 |
| 5,444,881 A | | 8/1995 | Landi et al. | 5/454 |
| 5,517,691 A | | 5/1996 | Blake | 2/5 |
| 5,544,367 A | | 8/1996 | March, II | 2/410 |
| 5,551,082 A | | 9/1996 | Stewart et al. | 2/2 |
| 5,565,259 A | | 10/1996 | Juriga | 428/138 |
| 5,581,809 A | | 12/1996 | Mah | 2/20 |
| 5,641,068 A | * | 6/1997 | Warner | 206/523 |
| 5,664,825 A | | 9/1997 | Henke et al. | 296/136 |
| 5,686,689 A | | 11/1997 | Snedeker et al. | 89/36.02 |
| 5,689,828 A | | 11/1997 | Mah | 2/16 |
| 5,718,968 A | | 2/1998 | Cutler et al. | 428/218 |
| 5,747,134 A | | 5/1998 | Mohammed et al. | 428/57 |
| 5,786,394 A | | 7/1998 | Slaven | 521/51 |
| 5,794,270 A | | 8/1998 | Howat | 2/410 |
| 5,804,757 A | | 9/1998 | Wynne | 89/36.05 |
| 5,806,796 A | | 9/1998 | Healey | 244/117 R |
| 5,819,312 A | | 10/1998 | Snyder et al. | 2/16 |
| 5,879,780 A | | 3/1999 | Kindinger et al. | 428/116 |
| 5,881,395 A | | 3/1999 | Donzis | 2/455 |
| 5,887,453 A | | 3/1999 | Woods | 66/171 |
| 5,891,541 A | | 4/1999 | Wynne | 428/57 |
| 5,910,126 A | | 6/1999 | Wilson et al. | 602/75 |
| 5,915,819 A | | 6/1999 | Gooding | 36/29 |
| 5,928,755 A | | 7/1999 | Mullen | 428/102 |
| 5,934,737 A | | 8/1999 | Abouzahr | 296/146.6 |
| 5,938,648 A | | 8/1999 | LaVon et al. | 604/358 |
| 5,946,734 A | | 9/1999 | Vogan | 2/412 |
| 5,950,244 A | | 9/1999 | Fournier et al. | 2/414 |
| 5,952,078 A | | 9/1999 | Park | 428/105 |
| 6,035,452 A | | 3/2000 | Braxton | 2/455 |

OTHER PUBLICATIONS

"Styrocolor® G" Product Information; BASF Aktiengesellschaft; 1999; 1 page.

GECET™ Chemical Properties;Technical Bulletin No. 5-4.0; Aug., 1999; 4 pages.

GECET™ Processing; Technical Bulletin No. 5-1.0; Aug., 1999; 2 pages.

GECET™ Expandable Engineering Resins; F-100 Molded Product Properties; Aug. 1999; 1 page.

GECET™ Expandable Engineering Resins; F-300 Molded Product Properties; 1999; 1 page.

GECET™ Expandable Engineering Resins; F-200 Molded Product Properties; Technical Bulletin 5-3.2; 1999; 1 page.

R-MER™ Brand Grade 25 Expandable Resin; Technical Bulletin No. 5-5.0; 1999; 1 page.

Huntsman Expandable Polystyrene Grade 40; Technical Bulletin No. 4-4.2; 1999; 2 pages.

Huntsman Expandable Polystyrene Grade 55; Techinical Bulletin No. 3-3.2; 1999; 2 pages.

Huntsman Expandable Polystyrene Grade 61; Technical Bulletin No. 3-3.3; Aug., 1999; 2 pages.

Huntsman Expandable Polystyrene Grade 71; Technical Bulletin No. 3-3.4; 1999; 2 pages.

* cited by examiner

IMPACT ABSORBING COMPOSITE

BACKGROUND OF THE INVENTION

The present invention generally relates to an impact absorbing composite. More specifically, the present invention relates to an impact absorbing composite that is formed of separate, discrete, and independent impact absorbing members. The impact absorbing composite is capable of conforming to complex three-dimensional surfaces. Also, the impact absorbing composite is capable of both absorbing and dissipating energy from an impact that is applied against the impact absorbing composite. The present invention further relates to a method of making the impact absorbing composite.

Enhanced participation in contact sports, such as football, soccer, and rugby, along with enhanced participation in other high impact energy activities, such as inline skating and white water kayaking, has fueled the demand and need for improved impact absorbing materials. These types of contact sports and high-impact activities often cause application of high energy impacts against discrete portions of the human body that often cause bruises and even more serious injuries, such as broken or fractured bones.

Besides the noted contact sports and high energy impact activities, there are a number of other activities that, in the event of an accident or spill, may cause injury to the body. Until the past few years, participation in these activities, such as bicycle riding, was not considered to be an activity requiring much protective equipment. Now, however, bicycle riders of all ages are routinely advised to wear a protective bicycle helmet. Also, over the past few years, there has been a tremendous growth in off-road activities, such as mountain biking, motocross on both bicycles and motorcycles, and all terrain vehicle (ATV) usage on off-road trails.

In addition to these activities there has been a tremendous rate of growth in other applications for impact absorbing materials. For example, there has been an enhanced focus upon making automobiles safer to both the driver and passengers during automobile crashes. Years ago, passenger compartments in automobiles routinely had unpadded, bare metal surfaces. While such bare unprotected surfaces have gradually disappeared from today's automobiles, there is still a continuing emphasis upon making both interior automobile surfaces safer for the driver and passengers. Also, automobile manufacturers increasingly focus upon incorporating safer materials in automobile components that will help to absorb and dissipate impact energies that are created in automobile crashes.

Even in more mundane activities, such as walking, there has been an increased emphasis upon energy-absorbing surfaces and products for human beings. First, flooring manufacturers are developing new flooring materials that are more energy absorbent and more comfortable for pedestrians. Also, shoe manufacturers are increasingly marketing energy absorbing soles for shoe purchasers. Indeed, there is a large market demand for after market impact absorbing shoe inserts. Marketing of such shoe inserts is often targeted to participants in sports, such as basketball, football, soccer, and running, where repetitive impacts during each successive step may cause injuries to the foot and lower leg, such as sprains, shin splints, and even broken bones.

Due to the enhanced market for impact absorbing materials, great strides have been made toward reducing injuries generated by impacts that are applied against the human body. However, many of these new impact absorbing materials merely amount to laminates of multiple continuous layers. Continuous layers suffer from a couple of different problems, typically. For example, continuity of a layer will often inhibit the ability of adjacent layers to fully exhibit properties, such as elasticity, of the adjacent layers. For example, where a pair of layers are laminated together, and both layers have a certain degree of elasticity, the layer with the lower degree of elasticity will inhibit the layer with the higher degree of elasticity from fully exhibiting that higher degree of elasticity. Also, where one continuous layer is fairly rigid and an adjacent continuous layer is fairly flexible, the fairly rigid continuous layer will inhibit the ability of the flexible continuous layer to exhibit the flexibility.

The existing impact absorbing materials that are formed of continuous layers, only, necessarily must sacrifice some degree of impact absorbing capability. First, layer thicknesses must typically be minimized to prevent the impact absorbing material from becoming too heavy and bulky for consumer tastes. Also, to the degree that impact absorbance depends upon elevated rigidity in one of the continuous layers, existing impact absorbing materials consequently sacrifice flexibility and the ability to conform to complex three-dimensional shapes in favor of enhanced impact absorbance capability, or, alternatively, sacrifice impact absorbing capability in favor of enhanced flexibility and ability to conform to complex three-dimensional surfaces.

One reason that manufactures of impact absorbing materials have come to rely primarily upon continuous layers is that manufacture of impact absorbing materials with discontinuous layers has been traditionally considered to be technically impractical and expensive. With the increased degree of automation in manufacturing activities, manufacturers have typically focused upon manufacturing processes relying upon continuous webs of material that may be formed, laminated, and transported via efficient conveying systems. This has led many manufacturers of impact absorbing materials to focus upon manufacture of more technically complex and expensive continuous layers in search of improved material flexibility material impact absorbance. While such improvements have enhanced the knowledge base with regard to impact absorbing materials, these approaches have typically enhanced, sometimes dramatically, the cost of impact absorbing materials to the consumer, while still failing to uncouple the property interdependence existing between continuous layers in existing impact absorbing materials. Therefore, despite these industry developments, existing impact absorbing materials that are formed of multiple continuous layers continue to sacrifice flexibility and conformability in favor of impact absorbance, or continue to sacrifice impact absorbance in favor of flexibility and conformability.

As another example, impact absorbing products have been developed that incorporate a fluid within a polymeric envelope. When an impact is applied against one portion of the envelope, the fluid is displaced to a portion of the envelope located away from the impact point on the envelope. The envelope is typically made of a somewhat flexible polymeric material. The energy of the impact against the envelope is typically dissipated by generation of pressure in the fluid, with consequent expansion of the envelope. While such an impact absorbing material does, theoretically, have many benefits, practical considerations limit the actual capabilities of such a material. For example, the volume of fluid within the envelope must typically be limited due to the density of the fluid contained within the envelope and the consequent overall weight of the fluid-filled envelope. Such limitations of the envelope volume necessarily limit the thickness of the fluid layer within the envelope, which thereby detracts from the impact absorbing capabilities of the fluid-filled envelope.

While many enhancements have been developed and introduced to consumers of impact absorbing materials, these improved impact absorbing materials continue to suffer from a number of drawbacks. For example, technical improvements within individual continuous layers of existing impact absorbing materials have caused great increases in the costs of these impact absorbing materials to consumers. Also, continued industry reliance upon only continuous layers in some impact absorbing materials prevent these impact absorbing materials from fully exhibiting the flexibility characteristics of the more flexible continuous layer while also fully exhibiting the impact absorbing properties of the continuous layer that has the greater impact absorbing capability.

Thus, a need exists for an impact absorbing composite that exhibits both enhanced flexibility and conformability along with enhanced impact absorbing capabilities. Also, a need exists for an improved impact absorbing material that successfully couples a discontinuous impact absorbing layer with a flexible and conformable continuous layer. Furthermore, a need exists for a new method of manufacturing an impact absorbing material that exhibits both enhanced flexibility and conformability, along with enhanced impact absorbing properties. The impact absorbing composite of the present invention provides a solution to each of these difficult challenges.

BRIEF SUMMARY OF THE INVENTION

The present invention includes an impact absorbing composite structure. The impact absorbing composite structure has a plurality of impact absorbing members and a first flexible layer. Each impact absorbing member is integral with the flexible layer. The present invention further includes a method of forming an impact absorbing composite.

DETAILED DESCRIPTION

The present invention generally relates to an impact absorbing composite. More specifically, the present invention relates to an impact absorbing composite that is formed of separate, discrete, and independent impact absorbing members. The impact absorbing composite is capable of conforming to complex three-dimensional surfaces. Also, the impact absorbing composite is capable of both absorbing and dissipating energy from an impact that is applied against the impact absorbing composite. The present invention further relates to a method of making the impact absorbing composite.

Figure 1:
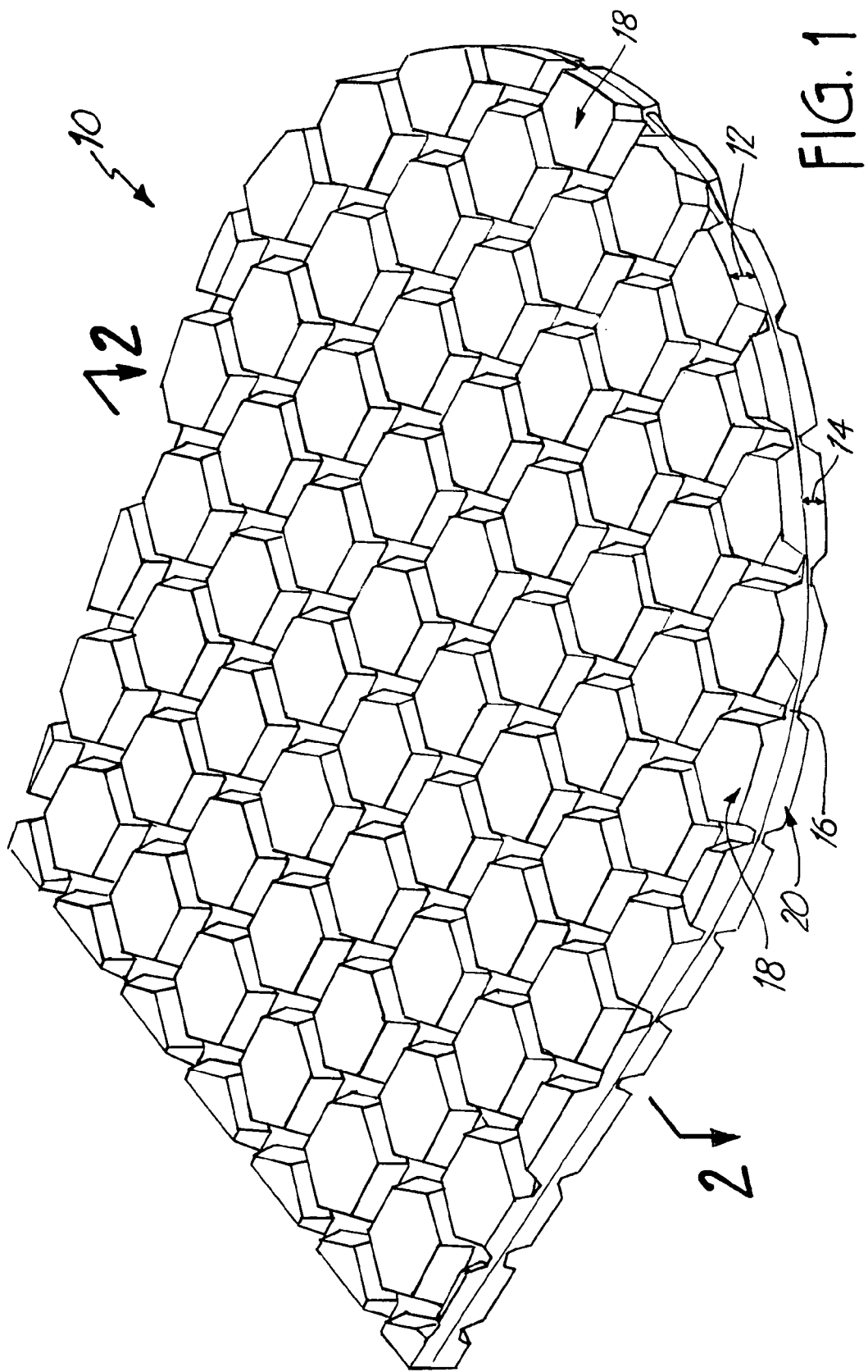
FIG. 1 is a perspective view of an impact absorbing composite of the present invention.

The impact absorbing composite of the present invention is generally depicted at 10 in FIG. 1. The impact absorbing composite 10 includes a first impact absorbing layer 12, a second impact absorbing layer 14, and a flexible substrate web or layer 16 that is located between the first impact absorbing layer 12 and the second impact absorbing layer 14. The first impact absorbing layer 12 is formed of a plurality of impact absorbing members 18, and the second impact absorbing layer 14 is formed of a plurality of impact absorbing members 20.

Figure 2:
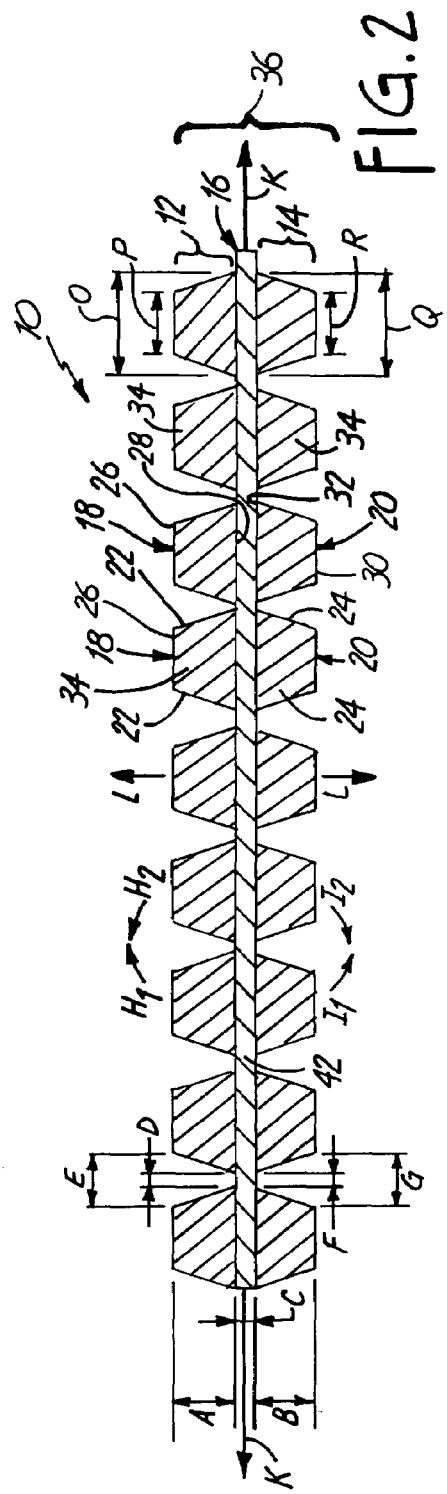
FIG. 2 is a cross-sectional view through line 2-2 of the impact absorbing composite depicted in FIG. 1.

As best depicted in FIG. 2, the impact absorbing members 18 each have a plurality of side walls 22, and the impact absorbing members 20 each have a plurality of side walls 24. Also, each impact absorbing member 18 has an exterior wall 26 and an interior wall 28. Likewise, each impact absorbing member 20 has an exterior wall 30 and an interior wall 32. Though the walls 22, 24, 26, and 30 are each depicted as being linear, any or all of the walls 22, 24, 26, and 30 may be curvilinear, multiplanar, or any combination of these. As used herein, the term "multiplanar" refers to a wall that is defined, at least in part, by at least two different planes that are distinct from each other and are not coplanar.

In the impact absorbing composite 10, the members 18, 20 are each formed of a material 34. The flexible substrate layer 16 of the impact absorbing composite 10, may, as some non-exhaustive examples, be formed of mesh, netting, fabric, cloth, or textile. The flexible substrate layer 16 may have a plurality of pores, holes, or spaces (not shown) that extend fully through the layer 16. The material 34 of both the members 18 and the members 20 may be present in, or may even fill, these pores, holes, or spaces of the layer 16. Consequently, in the impact absorbing composite 10, each impact absorbing member 18 and impact absorbing layer 20 that are in registry with each may in fact be integral with each other and collectively form an impact absorbing member 36. Thus, the flexible substrate layer 16 may actually be integral with, and pass through, each separate impact absorbing member 36.

Though not depicted, the impact absorbing composite 10 may alternatively include a first adhesive layer (not shown) that overlies and is in contact with the flexible substrate layer 16 and is located between the flexible substrate layer 16 and the first impact absorbing layer 12. Likewise, though not depicted, the impact absorbing composite 10 may also include a second adhesive layer that overlies and is in contact with the flexible substrate layer 16 and is located between the flexible substrate layer 16 and the second impact absorbing layer 14. With this arrangement, the first adhesive layer attaches the impact absorbing members 18 of the first impact absorbing layer 12 to the flexible substrate layer 16, and the second adhesive layer attaches the impact absorbing layers 20 of the second impact absorbing layer 14 to the flexible substrate layer 16. Though use of the first and second adhesive layers is permissible, it is preferred that the first and second adhesive layers be excluded to permit integral formation of the impact absorbing members 18 with the impact absorbing members 20 and allow integration of the flexible substrate layer 16 in the impact absorbing member 36 via the material 34 that is present in both the members 18, 20 and in the pores, holes, or spaces of the flexible substrate layer 16.

In the impact absorbing composite 10, each impact absorbing member 18 is preferably distinct from, and capable of moving independently with respect to, every other impact absorbing member 18 of the impact absorbing composite 10. Unless otherwise indicated herein, all comments about the impact absorbing members 18 are equally applicable to the impact absorbing members 20. Thus, like the impact absorbing members 18, each individual impact absorbing member 20 is preferably discrete from, and capable of moving independently with respect to, every other impact absorbing member 20 within the impact absorbing composite 10. One advantage of the impact absorbing composite 10 is the ability for the impact absorbing composite 10 to closely conform to a three-dimensional surface when the impact absorbing composite 10 is placed against the three-dimensional surface.

The impact absorbing members 18, and consequently the first impact absorbing layer 12, may generally have any desired thickness A. Additionally, if desired, different impact absorbing members 18 may have different thicknesses A. Nonetheless, each of the impact absorbing members 18 preferably have the same thickness A to simplify manufacture of the impact absorbing composite 10. The impact absorbing members 20, and consequently the second impact absorbing layer 14, may generally have any desired thickness B. Additionally, if desired, different impact absorbing members 20 may have different thicknesses B. Nonetheless, each of the impact absorbing members 20 preferably have the same thickness B to simplify manufacture of the impact absorbing composite 10. When the impact absorbing composite 10 is formed into a protective garment for a person to wear, it has been found that both the thickness A of the impact absorbing members 18 and the thickness B of the impact absorbing members 20 may generally range from about ¼ inch (about 0.6 centimeters) to about one inch (about 2.5 centimeters), though thickness A and/or B outside this range are permissible.

Overall, the combined thickness of thickness A and thickness B, when used in a protective garment by a person, must necessarily balance an acceptable degree of bulk versus an acceptable level of impact absorption. Additionally, it is permissible for the thickness A and the thickness B to be different from each other. Furthermore, though some examples of thicknesses A and B are provided above, the particularly described thicknesses A, B are provided only with respect to protective articles to be worn by humans. In other applications, where bulk and comfort considerations are less important or are irrelevant, such as in use of the impact absorbing composite 10 in a vehicle application, in a flooring application, or in a packaging application, the thicknesses A, B may be selected to place more focus upon the desired level of impact absorption protection.

The flexible substrate layer 16 of the impact absorbing composite 10 may also have any thickness C. Typically, the thickness C will be a small percentage, or even a negligible percentage, of the thickness A and of the thickness B. The flexible substrate layer 16 essentially functions as a support for the individual impact absorbing members 18, 20. Thus, depending upon the particular material that forms the flexible substrate layer 16, the thickness C of the flexible substrate layer 16 may be minimized as the strength of the material used to form the flexible substrate layer 16 is enhanced. Ultimately, since the flexible substrate layer 16, in use, may undergo repeated stretching and flexing, the thickness C of the flexible substrate layer 16, taking into account the properties of the material used to form the layer 16, should be thick enough to allow the layer 16 to undergo repeated stretching and flexing, without tearing or breakage of the layer 16. In some exemplary applications, such as use of the impact absorbing composite 10 as a protective article for a human, it is believed that the thickness C of the layer 16 may generally range from about 5 millimeters to about 20 millimeters, depending upon the particular material selected to form the flexible substrate layer 16.

The impact absorbing members 18 may generally have a width O between the side walls 22, proximate the interior wall 28, ranging from about ½ inch (about 1.3 centimeters) upward to about two inches (about 5.1 centimeters), or three inches (about 7.6 centimeters), or even more, with the proviso that the width O should be sufficient to overlap enough fibers or strands of the flexible substrate layer 16 to provide durable attachment of the impact absorbing members 18 and the flexible substrate layer 16. The impact absorbing members 18 may generally have a width P between the side walls 22, proximate the exterior wall 26, ranging from about ¼ inch (about 0.6 centimeters) upward to about two inches (about 5.1 centimeters), or three inches (about 7.6 centimeters), or even more. In typical applications, it is envisioned that the width P will be approximately the same as, or less than, the width O.

The impact absorbing members 20 may generally have a width Q between the side walls 24, proximate the interior wall 32, ranging from about ½ inch (about 1.3 centimeters) upward to about two inches (about 5.1 centimeters), or three inches (about 7.6 centimeters), or even more, with the proviso that the width Q should be sufficient to overlap enough fibers or strands of the flexible substrate layer 16 to provide durable attachment of the impact absorbing members 20 and the flexible substrate layer 16. The impact absorbing members 20 may generally have a width R between the side walls 24, proximate the exterior wall 30, ranging from about ¼ inch (about 0.6 centimeters) upward to about two inches (about 5.1 centimeters), or three inches (about 7.6 centimeters), or even more. In typical applications, it is envisioned that the width R will be approximately the same as, or less than, the width Q. Furthermore, though the width O and the width Q may be different from each other for members 18, 20 that are in registry with each other, the width O and the width Q for members 18, 20 that are in registry with each other are preferably either the same or about the same to simplify manufacture of the impact absorbing composite 10 and maximize the impact absorbance capabilities of the impact absorbing composite 10.

Other attributes of the impact absorbing members 18, 20, depend upon characteristics, such as the convex or concave nature and/or the continuity or degree of curvature of the three-dimensional surfaces that the impact absorbing composite 10 will be applied against in use. Where it is desired that the exterior walls 26 of the impact absorbing members 18 and the exterior walls 30 of the impact absorbing members 20 each be capable of application against both convex and concave three-dimensional surfaces, some particular attributes of the impact absorbing members 18 and impact absorbing members 20 will be desirable to permit conformance of the impact absorbing composite 10 to the particular three-dimensional surface.

As an initial consideration, the interior walls 28 of adjacent impact absorbing members 18 may be spaced apart from each other by any distance D, the exterior walls 26 of adjacent impact absorbing members 18 may be spaced apart from each other by any distance E, the interior walls 32 of adjacent impact absorbing members 20 may be spaced apart from each other by any distance F, and the exterior walls 30 of adjacent impact absorbing members 20 may be spaced apart from each other by any distance G. Preferably, however, the distance D between interior walls 28 of adjacent impact absorbing members 18 and the distances F between interior walls 32 of adjacent impact absorbing members 20 are minimized to enhance the ability of the impact absorbing composite 10 to spread the forces of applied impacts and to enhance the degree of penetration resistance upon impact by a sharp edge or point.

On the other hand, when it is desired that the exterior walls 26 be capable of positioning against both convex and concave three-dimensional surfaces and against three-dimensional surfaces that are either discontinuous or have a wide range of curvatures, the distances E between exterior walls 26 of adjacent impact absorbing members 18 should be large enough to allow pivoting of the impact members 18 about pivot points or hinges 42 of the flexible substrate layer 16 and consequent movement of adjacent impact absorbing members 18 toward each other in the direction of arrows $H_1$ and $H_2$. Likewise, when it is desired that the exterior walls 30 be capable of positioning against both convex and concave three-dimensional surfaces and against three-dimensional surfaces that are either discontinuous or have a wide range of curvatures, the distances G between exterior walls 30 of adjacent impact absorbing members 20 should be large enough to allow pivoting of the impact members 20 about pivot points or hinges 42 of the flexible substrate layer 16 and consequent movement of adjacent impact absorbing members 20 toward each other in the direction of arrows $I_1$ and $I_2$.

The flexible substrate layer 16, in addition to serving as a support for the impact absorbing members 18, 20, also, provides the pivot points or hinges 42 that allow independent movement of different impact absorbing members 18 relative to each other and independent movement of different impact absorbing members 20 relative to each other. The pivot points or hinges 42 of the flexible substrate layer 16 consequently support the ability of the impact absorbing composite 10 to closely conform to virtually any three-dimensional surface.

As those of ordinary skill in the art will readily recognize, when the exterior walls 26 of the impact absorbing members 18 are to be placed against convex three-dimensional surfaces or discontinuous three-dimensional surfaces defining an angle greater than 180°, the distances E between the exterior walls 26 of adjacent impact absorbing members 18 will need to be sufficient to take into account the degree of convexity of the three-dimensional surface or the extent by which the discontinuous three-dimensional surface defines an angle exceeding 180°. Likewise, when the exterior walls 30 of the impact absorbing members 20 are to be placed against convex three-dimensional surfaces or discontinuous three-dimensional surfaces defining an angle greater than 180°, the distances G between the exterior walls 30 of adjacent impact absorbing members 20 will need to be sufficient to take into account the degree of convexity of the three dimensional surface or the extent by which the discontinuity of the three dimensional surface defines an angle that exceeds 180°.

Throughout the drawings, like elements are referred to using like reference characters.

Figure 3:
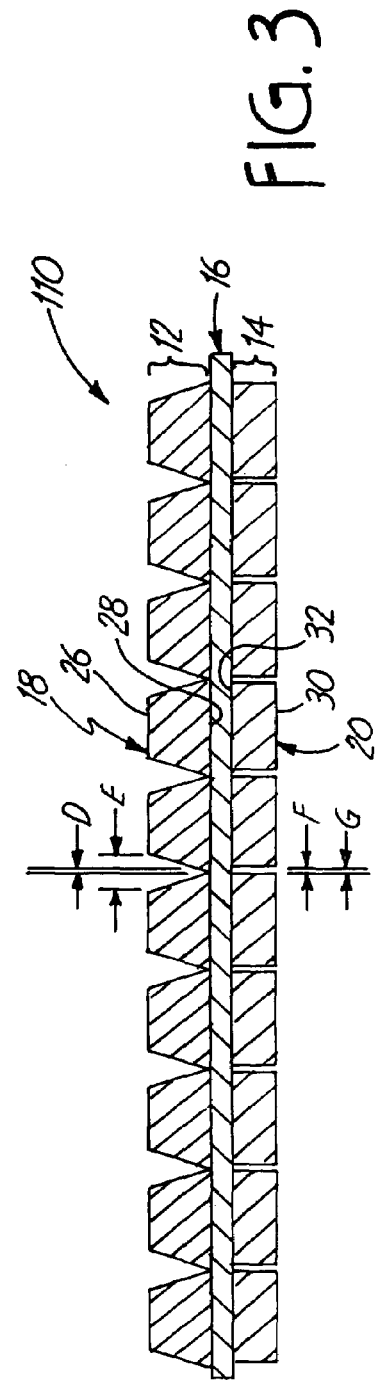
FIG. 3 is a cross-sectional view of another impact absorbing composite of the present invention.

Another form of the impact absorbing composite of the present invention is generally depicted at 110 in FIG. 3. The impact absorbing composite 110 is very similar to the impact absorbing composite 10, with the exception that the distances F and G are equal or approximately equal to each other for the impact absorbing members 20 in the impact absorbing composite 110. The impact absorbing composite 110 is designed for those applications where the exterior walls 30 of the members 20 of the impact absorbing composite 110 will not be positioned against convex three-dimensional surfaces and/or discontinuous three-dimensional surfaces defining angles greater than 180°.

In these particular applications, the exterior walls 26 of the impact absorbing members 18 may instead be positioned against convex three-dimensional surfaces or discontinuous three-dimensional surfaces defining an angle greater than 180°, while the exterior walls 30 of the impact absorbing members 20 face away from the three-dimensional surface. Consequently, in these applications, while the distances E between the exterior walls 26 of adjacent impact absorbing members 18 must be selected to accommodate the convexity of the three-dimensional surface or the extent by which the discontinuity of the three dimensional surface exceeds 180 degrees, there is no such need to make such accommodations in the distance G between the exterior walls 30 of adjacent impact absorbing members 20. In essence, in the impact absorbing composite 110, for the particular convex three-dimensional surface or discontinuous three-dimensional surface defining an angle greater than 180°, the distance G may be the same as, or even less than the distance F, since the impact absorbing members 20, proximate the exterior walls 30, do not move toward each other as the exterior walls 26 of the impact absorbing members 18 are being positioned against the convex three-dimensional surface and/or the discontinuous three-dimensional surface defining an angle greater than 180°.

The distance D between the interior walls 28 of adjacent impact absorbing members 18 may be zero millimeters, where adjacent impact absorbing members 18 are actually in contact with each other proximate the interior walls 28 of the impact absorbing members 18. Though adjacent impact absorbing members 18 may be in contact with each other, all impact absorbing members 18 are nevertheless preferably discrete and separate from each other and capable of independent movement, relative to each other. Consequently, due to this preferred discrete and separate nature of individual impact absorbing members 18, the first impact absorbing layer 12 is preferably a discontinuous layer even if individual impact absorbing members 18 are in contact with each other.

The distance D, while permissibly being as small as zero millimeters, may also permissibly ranging upward from zero millimeters to five millimeters, ten millimeters, or even more. Preferably, however, the distance D is about five millimeters or less, more preferably about two millimeters or less, and still more preferably about zero millimeters. The distance D between the interior walls 28 of adjacent impact absorbing members 18 is thus preferably minimized to enhance the impact spreading ability of the impact absorbing composite 10 and to enhance the ability of the impact absorbing composite 10 to resist penetration by sharp edges or points.

On the other hand, the distance E between the exterior walls 26 of adjacent impact absorbing members 18 will typically be larger than zero millimeters, and may permissibly be somewhat larger than distance D, to support the ability of the exterior walls 26, and consequently the first impact absorbing layer 12, to closely conform to convex three-dimensional surfaces and discontinuous three-dimensional surfaces defining an exterior angle of greater than 180°. As some non-exhaustive examples, the distance E will typically be greater than about zero millimeters and may range upward to five millimeters, ten millimeters, fifteen millimeters, or even more.

The distance F between the interior walls 32 of adjacent impact absorbing members 20 may be zero millimeters, where adjacent impact absorbing members 20 are actually in contact with each other proximate the interior walls 32 of the impact absorbing members 20. Though adjacent impact absorbing members 20 may be in contact with each other, all impact absorbing members 20 are nevertheless preferably discrete and separate from each other and capable of independent movement, relative to each other. Consequently, due to this preferred discrete and separate nature of individual impact absorbing members 20, the second impact absorbing layer 14 is preferably a discontinuous layer even if individual impact absorbing members 20 are in contact with each other.

The distance F, while permissibly being as small as zero millimeters, may also permissibly ranging upward from zero millimeters to five millimeters, ten millimeters, or even more. Preferably, however, the distance F is about five millimeters or less, more preferably about two millimeters or less, and still more preferably about zero millimeters. The distance F between the interior walls 32 of adjacent impact absorbing members 20 is thus preferably minimized to enhance the impact spreading ability of the impact absorbing composite 10 and to enhance the ability of the impact absorbing composite 10 to resist penetration by sharp edges or points.

On the other hand, the distance G between the exterior walls 30 of adjacent impact absorbing members 20 will typically be larger than zero millimeters, and may permissibly be somewhat larger than distance F, to support the ability of the exterior walls 30, and consequently the second impact absorbing layer 14, to closely conform to convex three-dimensional surfaces and discontinuous three-dimensional surfaces defining an exterior angle of greater than 180°. As some non-exhaustive examples, the distance G will typically be greater than about zero millimeters and may range upward to five millimeters, ten millimeters, fifteen millimeters, or even more.

Beyond taking into account the degree of convexity of the three-dimensional surface or angular size of the discontinuous three-dimensional surface that the exterior walls 26 will be placed against, the distance E between exterior walls 26 of adjacent impact absorbing members 18 will also necessarily have to take into account, and possibly be increased depending upon, the thickness A of the different absorbing members 18. Likewise, beyond taking into account the degree of convexity of the three-dimensional surface or angular size of the discontinuous three-dimensional surface that the exterior walls 30 will be placed against, the distance G between exterior walls 30 of adjacent impact absorbing members 20 will also necessarily have to take into account, and possibly be increased depending upon, the thickness B of the different absorbing members 20.

Figure 4:
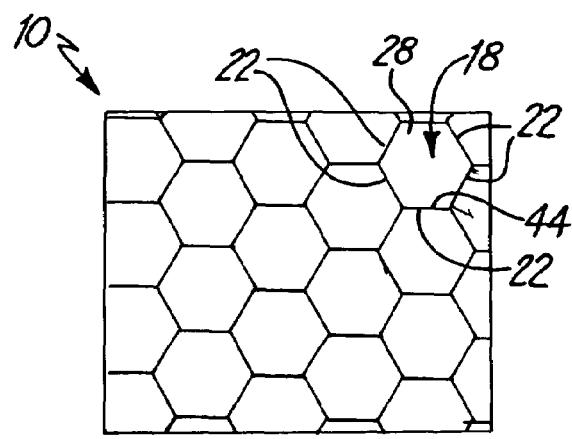
FIG. 4 is a top plan view of another impact absorbing composite of the present invention.

As best depicted in FIG. 4, any or all of the impact absorbing members 18 may have six side walls 22 and a hexagonal cross-section. In fact, the impact absorbing members 18 may each have any desired number of the side walls 22. For example, any or all of the impact absorbing members 18 may have only a single side wall 22 that provides a perimeter 44 of the impact absorbing member(s) with a rounded appearance. Alternatively, the perimeter 44 of each impact absorbing member 18 may have any closed shape formed of any number and any combination of lines and curves. As some non-exhaustive examples, the perimeter 44 may have the shape of a dumbbell or may be square or rectangular, round, triangular, quadrangular, pentagonal, octagonal, etc. Also, the shape of the perimeter 44 may vary along the thickness A (not shown in FIG. 4) of the impact absorbing members 18 and may vary between the different impact absorbing members 18. All comments provided above about the perimeter 44 of the impact absorbing members 18 apply equally to corresponding perimeters (not shown) of the impact absorbing members 20 (not shown in FIG. 4).

Figure 5:
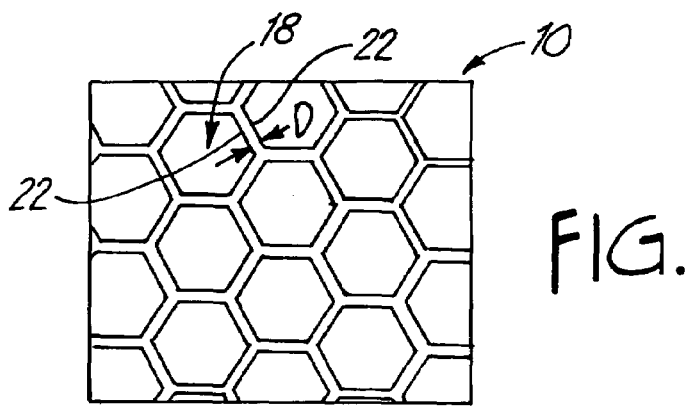
FIG. 5 is a top plan view of the impact absorbing composite depicted in FIG. 1.

Though each impact absorbing member 18 is in registry with an associated impact absorbing member 20, the different impact absorbing members 18 may be positioned with relation to each other in any desired pattern. For example, adjacent impact absorbing members 18 may be positioned face-to-face, such that the distance D (not shown in FIG. 4) between adjacent members 18 is zero millimeters and the sidewalls 22 of adjacent impact absorbing members 18 are in contact with each other, at least proximate the flexible substrate layer 16. As another alternative, though side walls 22 of adjacent impact absorbing members 18 may be positioned to directly face each other, as best depicted in FIG. 5, these side walls 22 of adjacent impact absorbing members 18 may be spaced apart from each other by the distance D that is greater than zero millimeters, such as about 2 millimeters, or any other selected distance D greater than zero millimeters.

Figure 6:
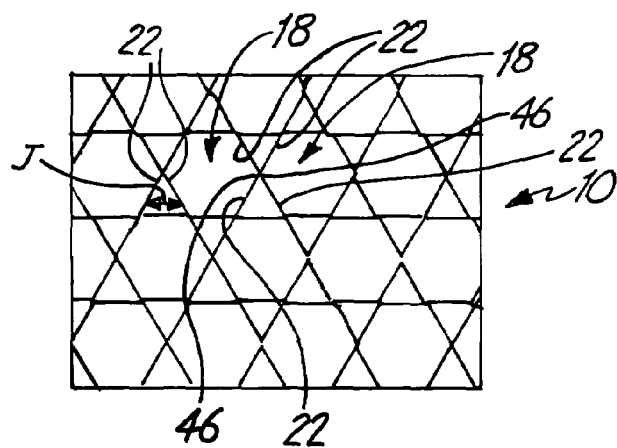
FIG. 6 is a top plan view of another impact absorbing composite of the present invention.

As yet another potential pattern, an intersection 46 of adjoining side walls 22 in one impact absorbing member 18 may be arranged to face the intersection 46 of any adjacent impact absorbing member 18, such that side walls 22 of adjacent absorbing members 18, though still facing each other, do not directly face each other, but instead face each other at an angle, such as an angle J. Furthermore, though a number of different patterns of adjacent impact absorbing members 18 are depicted in FIGS. 4-6, these different patterns are not exhaustive, and other examples exist and may be used. Furthermore, any combination of different placement patterns of adjacent impact absorbing members 18 may be incorporated in any particular impact absorbing composite 10. Of course, it is also permissible, and in fact preferable, to ordinarily include only a single placement pattern of adjacent impact absorbing members 18 in any particular impact absorbing composite 10 to minimize the expense of manufacturing the impact absorbing composite 10. All comments provided above about different placement patterns of the impact absorbing members 18 apply equally to the impact absorbing members 20 (not shown in FIGS. 4–6), with the proviso that each impact absorbing member 20 is in registry with a corresponding one of the impact absorbing members 18.

Returning to FIG. 2, the material 34 that is used to form the impact absorbing members 18, 20 may generally be any relatively lightweight, relatively stiff, closed cell plastic foam. For example, the material 34 may be a closed cell plastic foam formed by extrusion or by molding. There are a number of different techniques that may be used for expanding resin pellets and thereafter extruding or molding the expanded resin pellets to form the expanded resin pellets into the impact absorbing members 18, 20. These various techniques for expanding resin pellets and thereafter extruding and/or molding the expanded resin pellets to form the impact absorbing members 18, 20 are well within the knowledge of those of ordinary skill in the art and therefore are generally not described in detail herein.

As formed, the impact absorbing members 18, 20 should be solid, and without, or predominantly without, voids or cavities, where closed cells existent within the material 34 of the members 18, 20 are not considered to be voids or cavities. Also, the material 34 should generally have a density, as determined by ASTM Standard No. D1622-98, that ranges from about 1 pound per cubic foot (about 16 kilograms per cubic meter) to about 80 pounds per cubic foot (about 1281 kilograms per cubic meter). A copy of ASTM Standard No. D1622-98 that is entitled *Standard Test Method for Apparent Density of Rigid Cellular Plastics* may be obtained from the American Society for Testing and Materials of West Conshohocken, Pa. The material 34 should generally have a compressive strength @ 10% deformation, as determined by ASTM Standard No. D1621-00, that ranges from about 10 pounds per square inch (psi) (about 0.7 kilograms per square centimeter) to about 150 psi (about 10.5 kilograms per square centimeter) to provide the impact absorbing composite 10 with the ability to absorb a relatively broad range of applied impact forces. Preferably, the material 34 has a compressive strength @ 10% deformation, as determined by ASTM Standard No. D1621-00, that ranges from about 30 psi (about 2.1 kilograms per square centimeter) to about 110 psi (about 7.7 kilograms per square centimeter) to provide the impact absorbing composite 10 with the ability to adequately absorb applied impact forces of the type and size generally experienced by persons engaging in activities where exposure to applied impacts may reasonably occur. A copy of ASTM Standard No. D1621-00 that is entitled *Standard Test Method for Compressive Properties of Rigid Cellular Plastics* may be obtained from the American Society for Testing and Materials of West Conshohocken, Pa.

Additionally, the material 34 should generally have a tensile strength, as determined by ASTM Standard No. D1623-78 (Type A Specimen), of at least about 10 pounds per square inch (psi) (about 0.7 kilograms per square centimeter) to provide the impact absorbing composite 10 with the ability to absorb relatively large applied impact forces without breakage of the impact absorbing members 18 or the impact absorbing members 20. Preferably, the material 34 has a tensile strength, as determined by ASTM Standard No. D1623-78 (Type A Specimen) of at least about 15 psi (about 1.0 kilograms per square centimeter), and still more preferably of at least about 20 psi (about 1.4 kilograms per square centimeter), to provide the impact absorbing composite 10 with the ability to adequately absorb larger applied impact forces of the type and size less frequently experienced by persons engaging in activities where exposure to applied impacts may reasonably occur, without breakage of the impact absorbing members 18 or the impact absorbing members 20. A copy of ASTM Standard No. D1623-78 that is entitled *Standard Test Method for Tensile and Tensile Adhesion Properties of Rigid Cellular Plastics* may be obtained from the American Society for Testing and Materials of West Conshohocken, Pa.

Some non-exhaustive examples of suitable expandable resins that may be expanded and molded to form the material 34 of the impact absorbing members 18, 20 include expandable polystyrene (EPS) resin, expandable polypropylene (EPP), resins, expandable polyethylene (EPE) resins, expandable polystyrene/polyethylene copolymers, and any combination of any of these expandable resins. Some examples of suitable expandable styrene resins include Grade 40 expandable polystyrene resin, Grade 55 expandable polystyrene resin, Grade 61 expandable polystyrene resin, Grade 71 expandable polystyrene resin, and R-MER™ Grade 25 expandable polystyrene resin that are each available from Huntsman Chemical Corporation of Pasadena, Tex.; and STYROPOR® P expandable polystyrene resin and STYROCOLOR® G expandable polystyrene resin that are each available from BASF, Aktiengesellschaft of Mount Olive, N.J. Also, GECET™ F-100, F-200, and F-300 expandable engineering resins that are available from Huntsman Chemical Corporation are some non-exhaustive examples of expandable copolymers that are suitable for use in forming the material 34 of the impact absorbing members 18, 20.

Details about some exemplary properties of the Huntsman Grade 40, Grade 55, Grade 61, and Grade 71 expandable polystyrene resins are provided in Table I below:

TABLE I

Properties of Huntsman Expandable Polystyrene Resins

| DESCRIPTION | TYPE | BEAD SIZE | UNEXPANDED PARTICLE SIZE (MM) | BLOWING AGENT LEVEL | TYPICAL DENSITY RANGE $(LBS/FT^3)^A$ | TYPICAL DENSITY RANGE $(KG/M^3)^A$ |
|---|---|---|---|---|---|---|
| Grade 40 | 3640 | A | 1.00–1.60 | STANDARD | 0.95–1.25 | 15.2–20 |
| Expandable | 5640 | B | 0.70–1.10 | STANDARD | 0.95–1.25 | 15.2–20 |
| Polystyrene | 7640 | C | 0.40–0.75 | STANDARD | 1.10–1.30 | 17.6–20.8 |

TABLE I-continued

Properties of Huntsman Expandable Polystyrene Resins

| DESCRIPTION | TYPE | BEAD SIZE | UNEXPANDED PARTICLE SIZE (MM) | BLOWING AGENT LEVEL | TYPICAL DENSITY RANGE (LBS/FT³)^A | TYPICAL DENSITY RANGE (KG/M³)^A |
|---|---|---|---|---|---|---|
| Grade 55 | 5655 | B | .750–1.20 | STANDARD | 1.0*–1.25 | 16*–20 |
| Expandable | 5455 | B | .750–1.20 | LOW | 1.0*–2.0 | 16*–32 |
| Polystyrene | 5355 | B | .750–1.20 | LOW | 1.25*–4.0 | 20*–64 |
|  | 6655 | BC | .600–.850 | STANDARD | 1.0*–1.25 | 16*–20 |
|  | 6455 | BC | .600–.850 | LOW | 1.0*–2.0 | 16*–32 |
|  | 6355 | BC | .600–.850 | LOW | 1.25*–4.0 | 20*–64 |
|  | 7655 | C | .400–.650 | STANDARD | 1.2*–1.5 | 19.2*–24 |
|  | 7444 | C | .400–.650 | LOW | 1.2*–2.0 | 19.2*–32 |
|  | 7355 | C | .400–.650 | LOW | 1.25*–4.0 | 20*–64 |
| Grade 61 | 3661 | A | 1.1–1.6 | STANDARD | 1.0–1.2 | 16–19.2 |
| Expandable | 5661 | B | 0.7–1.1 | STANDARD | 1.0–1.2 | 16–19.2 |
| Polystyrene | 7661 | C | 0.4–0.7 | STANDARD | 1.25–2.0 | 20–32 |
| Grade 71 | 3371 | A | 1.1–1.6 | LOW | 1.5**–3.0 | 24**–48 |
| Expandable | 5371 | B | 0.7–1.1 | LOW | 1.5**–3.0 | 24**–48 |
| Polystyrene | 7371 | C | 0.4–0.7 | LOW | 1.5**–3.0 | 24**–48 |

*Low density form prepared with double pass or batch pre-expansion
**Densities below 2.0 pounds per cubic foot prepared with double pass or batch pre-expansion
^A After expansion and molding Details about some exemplary properties of the Huntsman R-MER™ Grade 25 expandable styrene resin, after expansion and molding, are provided in Table II below:

TABLE II

Properties of Huntsman R-MER ™ Grade 25 Expandable Styrene Resin Molded Product Properties

| PROPERTY | UNITS | ASTM TEST | VALUE | | |
|---|---|---|---|---|---|
| Density | lbs/ft³ (kg/m³) | C-303 | 1.25 (20) | 1.5 (24) | 2.00 (32) |
| Compressive Strength @ 25% | psi (Mpa) | D-1621 | 20 (0.14) | 23 (0.16) | 32 (0.22) |
| Tensile Strength | psi (Mpa) | D-1623 | 28 (0.19) | 41 (0.28) | 56 (0.39) |
| Tensile Elongation | % | D-1623 | 5 | 6 | 7 |
| Dynamic Set | % | | | | |
| 5 lbs. (2.3 kg) | | D-1596 | 10 | 8 | 6 |
| 10 lbs. (4.5 kg) | | D-1596 | 15 | 15 | 13 |
| 16 lbs. (7.2 kg) | | D-1596 | 20 | 22 | 18 |
| Compressive Creep @ 1000 hrs. @ 4 psi (0.28 kg/cm²) | % | D-3575 | .76 | .89 | .55 |
| Recommended End-Use Temperature | °F. (°C.) | None | 165 (72) | 165 (72) | 165 (72) |

Details about some exemplary properties of the GECET™ F-100, F-200, and F-300 expandable engineering resins, as expanded and molded, are provided in Table III below:

TABLE III

GECET ™ Expandable Engineering Resins Molded Product Properties

| PROPERTY | UNITS | ASTM TEST | PRODUCT NAME | TYPICAL PROPERTY |
|---|---|---|---|---|
| COMPRESSIVE STRENGTH @ 10% | psi (Mpa) | D-1621 | F-100 | 42 (0.29)* |
|  |  |  | F-200 | 70 (0.48)** |
|  |  |  | F-300 | 70 (0.48)** |
| FLEXURAL STRENGTH | psi (Mpa) | C-203 | F-100 | 180 (1.2)* |
|  |  |  | F-200 | 290 (1.9)** |
|  |  |  | F-300 | 290 (1.9)** |
| FLEXURAL MODULUS | psi (Mpa) | C-203 | F-100 | 5600 (38.0)* |
|  |  |  | F-200 | 5800 (39.4)** |
|  |  |  | F-300 | 5800 (39.4)** |
| THERMAL RESISTANCE (R-VALUE) | R-Value for 1-inch (2.54 cm) of thickness | C-518 | F-100 | 3.3* |
|  |  |  | F-200 | 3.4** |
|  |  |  | F-300 | 3.4** |

TABLE III-continued

GECET ™ Expandable Engineering Resins Molded Product Properties

| PROPERTY | UNITS | ASTM TEST | PRODUCT NAME | TYPICAL PROPERTY |
|---|---|---|---|---|
| WATER ABSORPTION | % by Volume | C-272 | F-100<br>F-200<br>F-300 | 0.3*<br>0.2<br>0.2 |
| WATER VAPOR PERMEABILITY | Perm-inch (Perm-cm) | E-96 | F-100<br>F-200<br>F-300 | 1.0* (2.54)<br>1.0 (2.54)<br>1.0 (2.54)** |
| FLAMMABILITY | PASS/FAIL | MVSS-302 | F-100<br>F-200<br>F-300 | PASS*<br>PASS<br>PASS |
| FLAMMABILITY | Not Applicable | UL-94 | F-100<br>F-200<br>F-300 | Not Available<br>94HBF<br>94HF-1 |

*Determined @ a density of 4 pounds per cubic foot (64.1 kilograms per cubic meter)
**Determined @ a density of 6 pounds per cubic foot (96.1 kilograms per cubic meter)

Some non-exhaustive examples of some functions the impact absorbing members 18, 20 may serve include absorbing and collectively dissipating impact forces, preventing abrasion of portions of the human body that are covered by the impact absorbing composite 10, and minimizing, or preferably preventing penetration of sharp edges and points through the impact absorbing composite 10 and into the portions of the human body covered by the impact absorbing composite 10. The relatively rigid form of the individual impact absorbing members 18, 20 allow these members 18, 20 to absorb and dissipate relatively minor impacts, such as a light bump into a wall or a floor, with no, or essentially no, subsequent degradation of impact absorbing performance. There may be some minor compression of the cell of the material 34 within the members 18,20, but the cells, after absorbing and distributing the impact between different cells and different members 18 and/or 20, thereafter rebound to their original size.

On the other hand, the closed cell foam of the material 34 and the members 18, 20 is capable of absorbing and dissipating much more significant impact forces to minimize and even prevent injuries to humans, animals, and inanimate objects. The flexible substrate layer 16 aids in this endeavor by maintaining different members 18 in working relation to each other and maintaining different members 20 in working relation to each other while also maintaining correspondence between members 18 that are in registry with associated members 20. This maintenance of the members 18 in working relation and members 20 in working relation allows any applied impact to effectively be spread to impact members 18, and/or impact members 20 that are not directly impacted by the impact source, along with members 18 and members 20 that are directly impacted by the impact source.

Upon application of an impact to the members 18 and/or 20 that is larger in force than an impact that merely compresses the cells of the material 34, cells that receive force from the impact will first compress, and thereafter may break to further dissipate the force applied by the impact. The inter-relationship between different members 18, 20, by virtue of the flexible substrate layer 16, allows the force of the impact to be distributed over a larger surface area on persons or animals wearing protective gear that is or incorporates the impact absorbing composite 10, as compared to the surface area of the person or animal to which the impact force would be directly applied in the absence of the impact absorbing composite 10.

In essence, the impact absorbing composite 10 receives the full force of the impact and, by virtue of collapse of cells of the material 34, the impact absorbing composite 10 sacrifices its own structural integrity to absorb and dissipate some, and oftentimes essentially all, of the impact force, while also spreading the impact force over much, if not all, of the portion of the human or animal body that is covered by the impact absorbing composite 10. These abilities of the impact absorbing composite 10 allow the impact absorbing composite 10 to generally reduce or even eliminate injury due to the impact. For example, an impact that would ordinarily be sufficient to break or fracture a bone, will, by virtue of the impact absorbing composite 10, be spread over a larger portion of the bone, or even all of the bone; consequently, the impact absorbing composite will help minimize or even eliminate the chance that bone breakage or fracture will occur.

As noted, the flexible substrate layer 16 plays an important role as part of the impact absorbing composite 10. First, the flexible substrate layer 16 helps to maintain the impact absorbing members 18, 20 in the desired pattern, while also allowing the impact absorbing composite 10 and the impact absorbing members 18, 20 to independently conform to whatever surface the impact absorbing composite 10 is applied against, such as any complex three-dimensional surface. Also, the flexible substrate layer 16 adds some penetration protection against applied penetration forces, such as a force applied by a sharp edge or a pointed object. Furthermore, by virtue of maintaining the members 18, 20 in working relation, while also allowing independent movement of adjacent members 18 and independent movement of adjacent members 20, the flexible substrate layer 16 additionally supports transfer of applied impact forces among adjacent members 18, 20 and further dissipation of the applied impact force.

The flexible substrate layer 16 may be a porous laminar material that includes a plurality of spaced apart pores, holes, or spaces that extend through the entire thickness C of the flexible substrate layer 16. These pores, spaces, or holes help to bond the members 18, 20 to the flexible substrate layer 16, no matter how this bonding is produced. As one example previously discussed, this bonding may be obtained by adhesive layers attached between the members 18 and the layer 16 and between the members 20 and the layer 16. In this application, the adhesive tends to fill the pores, spaces, or holes in the layer 16 to thereby fix the layer 16 between members 18,20 that are in registry with each other and to thereby effectively integrate the members 18, layer 16, and members 20 together as part of the impact absorbing members 36 of the impact absorbing composite 10.

As another alternative, the impact absorbing composite 10 may be manufactured by a process that effectively bonds material 34 located within the pores or spaces of the layer 16 to material 34 of both the members 18 and the members 20. Once again, this formation technique effectively integrates the layer 16 within the impact absorbing members 36 that incorporate both impact absorbing members 18 and impact absorbing members 20 that are in registry with each other. Additionally, besides being integrated within the members 36, the layer 16 may also have flexibility (drapeability) properties. Though the flexibility (drapeability) properties of the layer 16 are preferably appropriate for the particular selected application of the impact absorbing composite 10, the layer 16 may be provided with any desired flexibility (drapeability) properties. Preferably, the layer 16 has flexibility (drapeability) properties that allow the layer 16 to flex and support conformance of the impact absorbing composite 10 to complex three-dimensional shapes.

Additionally, the layer 16 may also have elongation properties. Though the elongation properties of the layer 16 are preferably appropriate for the particular selected application of the impact absorbing composite 10, the layer 16 may be provided with any desired elongation properties. Preferably, the layer 16 has elongation properties that are also sufficient to accommodate stretching beyond that required for actually conforming to three-dimensional surfaces, since stretching (elongation) may be necessary for positioning the impact absorbing composite 10 in conformance with three dimensional surfaces. For example, stretching may be required when the impact absorbing composite 10 is incorporated into an article of clothing and stretching of the layer 16 is required to insert a person's arms into the arm portion of the clothing article.

Furthermore, the layer 16 may also have elasticity properties. Though the elasticity properties of the layer 16 are preferably appropriate for the particular selected application of the impact absorbing composite 10, the layer 16 may be provided with any desired elasticity properties. Preferably, the layer 16 has elasticity properties that are sufficient to bring the bring the impact absorbing composite into conformance with three-dimensional surfaces after completion of any stretching (elongation) done in preparation for positioning the impact absorbing composite 10 in conformance with three dimensional surfaces. For example, where the impact absorbing composite 10 is incorporated into an article of clothing and stretching of the layer 16 is required to insert a person's arms into the arm portion of the clothing article, the layer 16 preferably has elasticity properties that are sufficient to bring the impact absorbing composite 10 into conformance with the person's body after the person has stretched the layer 16, as necessary, and completed insertion of the person's arms into the arm portion of the clothing article.

Unless otherwise indicated, all elongation and elasticity properties described herein for the layer 16 preferably exist within the layer 16 in directions that are parallel or coexistent with an axis K that lies entirely within the layer 16 and also in all directions within the layer 16 that are perpendicular to the axis K. Likewise, unless otherwise indicated, all flexibility (drapeability) properties described herein for the layer 16 preferably exist within the layer 16 in all directions within the layer 16.

As used herein, the term "flexibility" (also sometimes referred to as "drapeability"), when used with reference to the layer 16, refers to the ability of the layer 16 to bend easily. Generally, the flexibility (or drapeability) of the layer 16 is enhanced as the diameter (or cross-sectional area) of the fibers that form the layer 16 is decreased. As used herein, the term "elongation", when used with reference to the layer 16, refers to the ability of the layer 16 to stretch under application of tensile stress to the layer 16. Also, as used herein, the term "elasticity" refers to the ability of the layer 16 to return to its original shape, size, and length after release of tensile stress that has elongated the layer 16.

Generally, the flexibility (or drapeability) of the layer 16 is most easily determined in the absence of the impact absorbing members 18, 20. The flexibility (or drapeability) of the layer 16 is preferably sufficient to allow at least about 80 percent of the layer 16, when draped over any three dimensional surface, to come into contact with the three dimensional surface. More preferably, the flexibility (or drapeability) of the layer 16 is sufficient to allow at least about 90 percent of the layer 16, when draped over any three dimensional surface, to come into contact with the three dimensional surface. Still more preferably, the flexibility (or drapeability) of the layer 16 is sufficient to allow at least about 95 percent of the layer 16, when draped over any three dimensional surface, to come into contact with the three dimensional surface.

The elongation of the layer 16 may be determined in accordance with the procedures and apparatus described in ASTM Standard No. D4964-96 that is entitled *Standard Test Method for Tension and Elongation of Elastic Fabrics (Constant-Rate-of-Extension Type Tensile Testing Machine)* that may be obtained from the American Society for Testing and Materials of West Conshohocken, Pa. Under an applied tension of about 8.9 Newtons (about 2.0 pounds of force), the layer 16 preferably exhibits an elongation of at least about 5%, more preferably exhibits an elongation of at least about 10%, still more preferably exhibits an elongation of at least about 15%, and most preferably exhibits an elongation of at least about 20%. The elasticity of the layer 16 may be determined following completion of the elongation determination. Preferably, upon release of the tension applied during the elongation determination, the layer 16 returns to a length that is no more that about 102% of the length of the layer 16 prior to the elongation testing, more preferably no more than about 101% of the length of the layer 16 prior to the elongation testing, and most preferably about 100% of the length (or about the same length) of the layer 16 prior to the elongation testing.

Any pores, spaces, or holes through the flexible substrate layer 16 are preferably large enough to allow free passage of unexpanded resin beads, since one optional technique for manufacturing the impact absorbing composite 10 requires passage of unexpanded resin beads through the pores, spaces, or holes of the layer 16 during manufacture of the impact absorbing composite 10. The unexpanded resin beads generally have diameters ranging from about 0.7 millimeters to about 2 millimeters. Therefore, the pores, spaces, or holes through the flexible substrate layer 16 should generally have a cross-sectional diameter or width dimension of at least about 3 millimeters (about 0.12 inch), preferably at least about 5 millimeters (about 0.2 inch), and more preferably at least about 6.4 millimeters (about 0.25 inch) to allow free passage of the unexpanded resin beads without clogging at the pores, spaces, or holes of the layer 16. On the other hand, the pores, spaces, or holes of the layer 16 may generally have cross-sectional diameters or widths ranging up to about 10 millimeters (about 0.4 inch) or so, though smaller cross-sectional widths or diameters on the order of about 6.4 millimeters (about 0.25 inch), are preferred, to enhance the structural integrity provided to the impact absorbing composite 10 by the strands or fibers (not shown) that form the flexible substrate layer 16.

The strands or fibers that form the flexible substrate layer 16 may generally be any denier; preferably, the selected denier is consistent with the flexibility, elongation, and elasticity parameters described above for the flexible substrate layer 16. As used herein, "denier" is a measure of the weight of a length of fiber or strand that is used to characterize the thickness of the fiber or strand. Higher denier means larger fibers or strands, whereas smaller denier means finer fibers or strands. When a fiber is one denier, this means that 9,000 meters (about 5 miles) of the fiber has a weight of about 1 gram.

The flexible substrate layer 16 may be formed of a knitted or woven fabric layer. As used herein, a "knitted fabric" is a fabric that is produced by interlooping one or more strands of yarn or comparable material. Also, as used herein, a "woven fabric" is a fabric that is produced when at least two sets of fibers or strands are interlaced, usually, but not necessarily, at a right angles to each other, according to a predetermined pattern of interlacing. In woven fabrics, at least one set of fibers or strands is oriented parallel to a longitudinal axis along the longest dimension of the fabric. In woven fabrics, the yarns or strands running lengthwise in the woven fabric are referred to as the warp, whereas the yarn or strands that are oriented substantially perpendicular to the warp and fill in between the warp is referred to as the weft.

In correspondence with the prior discussion about the layer 16 preferably exhibiting certain elongation, elasticity and flexibility properties in the direction along and parallel to the axis K and also in directions within the layer 16 that are perpendicular to the axis K, the warp of any woven fabric used in the layer 16 may be considered to be along and parallel to the axis K, whereas the weft of any woven fabric used in the layer 16 may be considered to be oriented within the woven fabric and perpendicular to the axis K. Consequently, any woven fabric used in forming the layer 16 preferably has the described elongation, elasticity, and flexibility properties in both the warp direction and the weft direction.

Besides knitted or woven fabric, the flexible substrate layer 16 may be alternatively formed by any process that forms the flexible substrate layer 16 with a uniform or relatively uniform pattern of material strands or segments and uniformly or substantially uniformly distributed pores, spaces, or holes that pass through the thickness C of the flexible substrate layer 16. For example, one possible alternative manufacturing process entails extrusion of a film followed by punching, drilling, laser ablation, or similar formation of the uniform, or substantially uniform pattern, of pores, spaces, or holes through the thickness C of the flexible substrate layer 16.

Additionally, it is permissible to form the flexible substrate layer 16 to be free, or essentially free of pores, holes, or spaces with diameters or width dimensions larger than about 1 millimeter. Also, it is permissible to form the flexible substrate layer 16 to be free, or essentially free of any pores, holes, or spaces of any kind that extend through the thickness C of the layer 16. Preferably, however, these forms of the flexible substrate layer 16 are not employed, since these forms of the flexible substrate layer 16 are not as conducive to integration of the layers 16 as part of the impact modifying members 36. Furthermore, it is generally more difficult to strongly bond the impact absorbing members 18, 20 to these forms of the flexible substrate layer 16 using adhesives.

The flexible substrate layer 16 may be generally formed from any natural polymer or man-made polymer, provided that the selected natural polymer or man-made polymer is capable of withstanding any elevated temperature conditions, elevated pressure conditions, solvent applications, and/or adhesive applications present during formation of the members 18, 20 and bonding or integration of the members 18, 20 to or with the flexible substrate layer 16 during formation of the impact-absorbing composite 10. Some non-exhaustive examples of generally suitable natural polymeric fibers include cotton, flax, wool, bagasse, jute, and silk. Some non-exhaustive examples of generally suitable synthetic or man-made polymers include cellulose-based materials such as rayon, cellulose nitrate, cellulose acetate, cellulose triacetate; polyamides, such as nylon-6 or nylon-6,6; polyesters, such as polyethylene terephthalate; polyolefins, such as isotactic polypropylene or polyethylene; diene elastomers, such as LYCRA™ spandex that is available from E.I. DuPont de Nemours and Company of Wilmington, Del.; aramids; acrylonitrile; or any combination of any of these.

Preferably, the strands or fibers that are used in forming the flexible substrate layer 16 are hydrophobic to minimize weight gains in the impact absorbing composite 10 upon any introduction of moisture within the impact absorbing composite 10 and to minimize any reductions in tensile strength upon wetting of components of the impact absorbing composite 10. Some fibers, such as rayon and cotton, have a tendency to exhibit significant reductions in tensile strength upon absorption of water. Consequently, the flexible substrate layer 16 preferably includes little if any hydrophillic fibers, such as cotton and rayon.

As noted, one optional technique for bonding the impact absorbing members 18, 20 to the flexible substrate layer 16 involves application of adhesive layer to both major surfaces of the flexible substrate layer 16. One example of a suitable adhesive is a hot melt polyurethane sheet adhesive. Any other conventional adhesive may be used to form the adhesive layers that bond the members 18, 20 with the layer 16. Preferably, however, any adhesive used in forming the adhesive layers is water-resistant and more preferably hydrophobic to prevent any separation of the members 18, 20 from the layer 16 upon any exposure of the impact absorbing composite 10 to water.

Figure 7:
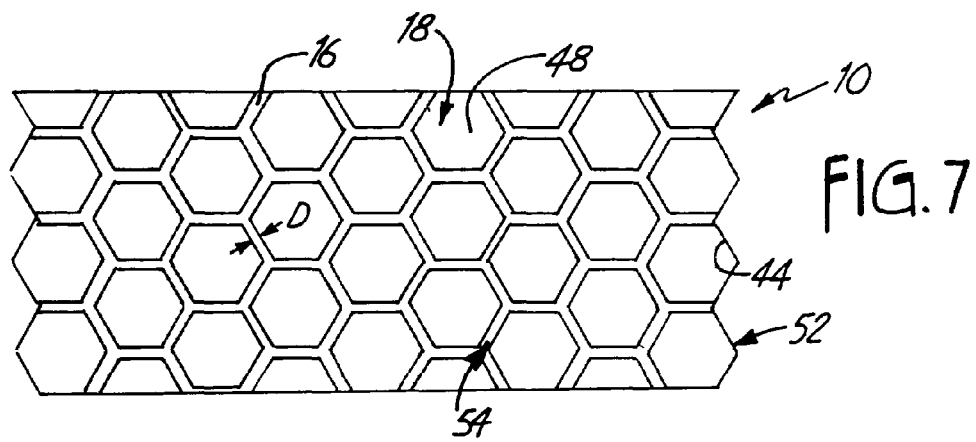
FIG. 7 is a top plan view of another impact absorbing composite of the present invention.

As best depicted in FIG. 7, each impact absorbing member 18, when superimposed on the flexible substrate layer 16, covers an area 48 of the flexible substrate layer 16. A line drawn about an outermost boundary 52 of the impact absorbing composite 10 along the outermost part of the perimeter 44 of each outermost impact absorbing member 18 circumscribes a bounded area 54 that delineates all portions of the impact absorbing composite 10 wherein the impact absorbing members 18 interface with the flexible substrate layer 16. As explained, the distance D between adjacent impact absorbing members 18 is preferably minimized, with the distance D preferably being zero or about zero so that adjacent impact absorbing members, though separate and distinct from each other, are actually in contact with each other.

Furthermore, the total of all areas 48 of all impact absorbing members 18, as a percentage of the bounded area 54 within the boundary 52, should generally be about 80 percent or more to provide the impact absorbing composite 10 with an acceptable impact absorbing potential and an acceptable impact penetration capability. More preferably, the total of the areas 48 of each of the members 18, expressed as a percentage of the bounded area 54, is at least about 90 percent, more preferably at least about 95 percent, and still more preferably at least about 99 percent, to further enhance the impact absorption potential and the impact penetration potential and impact absorbing composite 10. Most preferably, the total of the areas 48 of all the impact absorbing members 18, expressed as a percentage of the bounded area 54, is about 100 percent to maximize coverage of the flexible substrate layer 16 by the impact absorbing members 18 and more fully optimize the impact absorption capabilities and the impact penetration capabilities of the impact absorbing composite 10. Similar comments to those provided above with respect to the total of the areas 48 of all members 18, relative to the bounded area 54, apply to the coverage of the impact absorbing members 20 relative to the flexible substrate layer 16.

Recalling, with reference to FIG. 2, that the impact absorbing members 18 have the thickness A and the impact absorbing members 20 have the thickness B, it is permissible for the thicknesses A and B to be equal to each other, such that the flexible substrate layer 16 is located mid-way along a longitudinal axis L of each of the impact absorbing members 36 that are formed by each impact absorbing member 18, each corresponding impact absorbing member 20, and the portion of the layer 16 that is located between corresponding members 18, 20. On the other hand, it is also permissible for the thickness A and the thickness B to be different from each other; in this configuration, those of ordinary skill in the art will recognize that the flexible substrate layer 16 will be located closer to the exterior wall 26 of the member 18 than to the exterior wall 30 of the impact absorbing member 20 or, alternatively, closer to the exterior wall 30 of the impact absorbing member 20 than to the exterior wall 26 of the impact absorbing member 18. This adjustment capability of the flexibility substrate layer 16 along the axis L of the different impact absorbing members 36 provides flexibility for matching the impact absorbing composite 10 to different applications requiring different configurations of the impact absorbing composite 10.

Figure 8:
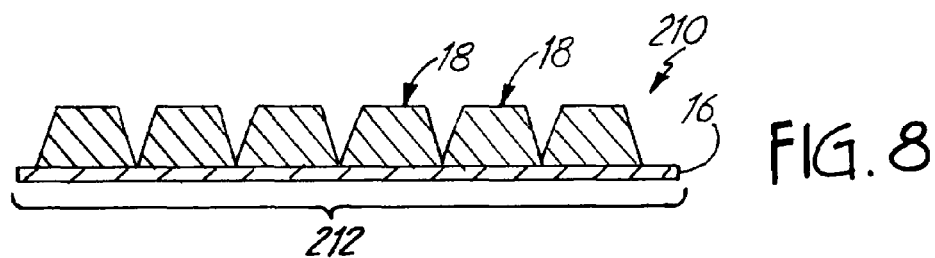
FIG. 8 is a cross-sectional view of another impact absorbing composite of the present invention.

As another alternative, an impact absorbing composite, as at 210 in FIG. 8, may be prepared. The impact absorbing composite 210 is similar to the impact absorbing composite 10, with the exception that the impact absorbing composite 210 excludes the impact absorbing members 20. Consequently, unlike the impact absorbing composite 10, an exterior portion 212 of the impact absorbing composite 210 is bounded by the flexible substrate layer 16. In the impact absorbing composite 210, like the impact absorbing composite 10, a variety of different attachment techniques, such as an adhesive layer or direct molding, may be employed to fixedly attach the impact absorbing members 18 and the flexible substrate layer 16 together as the impact absorbing composite 210.

Figure 9:
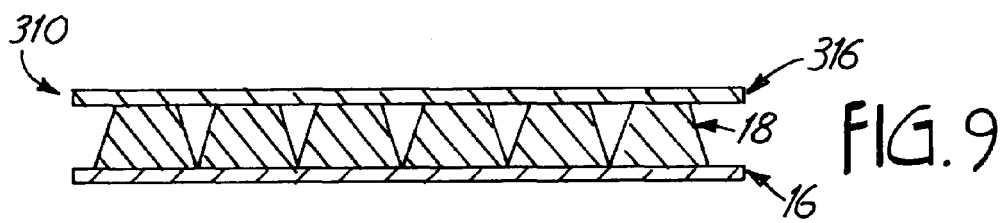
FIG. 9 is a cross-sectional view of another impact absorbing composite of the present invention.

Additionally, another impact absorbing composite, as best depicted at 310 in FIG. 9, may be formed. The impact absorbing composite 310 is similar to the impact absorbing composite 210, with the exception that the impact absorbing composite 210 additionally includes another flexible substrate layer 316. The flexible substrate 316 and the impact absorbing members 18 are fixedly attached together, using any of the techniques described herein for fixed attachment of the flexible substrate layer 16 and the impact absorbing members 18. Thus, the impact absorbing members 18 are each fixedly attached to both the flexible substrate layer 16 and to the flexible substrate layer 316 and are effectively sandwiched between both the flexible substrate layer 16 and the flexible substrate layer 316 in the impact absorbing composite 310.

Figure 10:
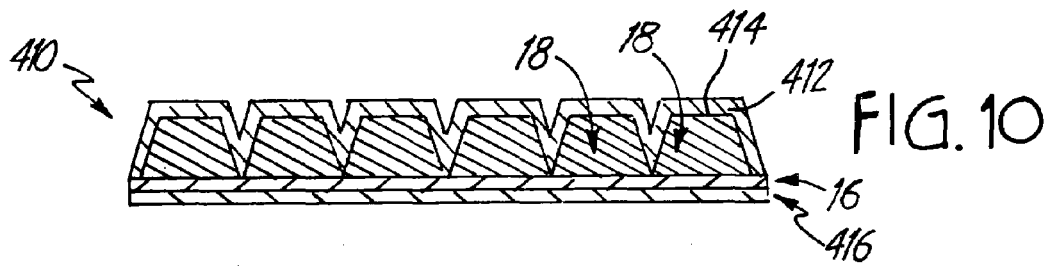
FIG. 10 is a cross-sectional view of another impact absorbing composite of the present invention.

As another alternative, another impact absorbing composite may be formed in accordance with the present invention, as best depicted at 410 in FIG. 10. The impact absorbing composite 410 is similar to the impact absorbing composite 210 (not shown in FIG. 10), with the exception that the impact absorbing composite 410 includes a padding layer 412 that is applied to exposed surfaces 414 of the impact absorbing members 18. Additionally, the impact absorbing composite 410 includes a padding layer 416 that is attached to the flexible substrate layer 16. Thus, the impact absorbing composite 410 incorporates the padding layers 412, 416 that effectively envelope or cover the impact absorbing composite 210.

As another alternative, either the padding layer 412 or the padding layer 416 may be omitted from the impact absorbing composite 410 to form a different impact absorbing composite (not shown). As yet another alternative, the impact absorbing composite 10 (not shown in FIG. 10) may be substituted for the impact absorbing composite 210 in the impact absorbing composite 410 to form another different impact absorbing composite (not shown) in which the padding layer 412 is applied to cover the impact absorbing members 18, and the padding layer 416 is applied to cover the impact absorbing members 20. In this configuration of the inventive impact absorbing composite, padding layers 412, 416 effectively envelope or cover the impact absorbing composite 10.

The optional padding layer 412 and the optional padding layer 416 enhance the comfort for persons wearing the impact absorbing composite 410 or any of the other alternatives that substitute the impact absorbing composite 10 or the impact absorbing composite 310 in place of the impact absorbing composite 210 in the impact absorbing composite 410. Additionally, depending upon the particular characteristics of the padding layer 412 and/or 416 that are selected, the padding layers 412, 416 may enhance impact absorbing properties. For example, the padding layers 412, 416 may be formed of a resilient material that enhances low level shock absorption by absorbing impact forces that are insufficient to collapse the cells of the material 34 within the impact absorbing member 18 and/or the impact absorbing member 20.

The material selected for the padding layer 412 and/or the padding layer 416 will preferably exhibit a degree of elasticity that will allow the impact absorbing members 18 to move independently with respect to each other and will likewise allow the impact absorbing members 20, if included, to move independently with respect to each other. Thus, the padding layers 412, 416 should not be rigid, but should instead be resilient coverings that do not significantly, or more preferably do not at all, restrict or inhibit exhibition of the preferred flexibility, elasticity, and elongation properties of the flexible substrate layer 16. Also, the layers 412, 416 should not affect the ability of the impact absorbing composite 410 and other padded variations of the impact absorbing composite 410 to conform to three-dimensional surfaces.

The padding layers 412, 416 may generally be formed of open cell or closed cell plastic foam; preferably, the selected foam helps retain, and does not significantly detract from, the preferred elongation, flexibility, and elasticity properties of the flexible substrate layer 16 within the padded impact absorbing composite 410 and other padded variations of the impact absorbing composite 410. Also, the open cell or closed cell plastic foam that is selected preferably do not affect the ability of the impact absorbing composite 410 and other padded variations of the impact absorbing composite 410 to conform to three-dimensional surfaces.

Some non-exhaustive examples of polymeric materials that may be used to produce suitable closed cell foams for use as the padding layers 412, 416 include ethylene vinyl acetate (EVA) copolymer, polyurethane, polyethylene, polyvinyl chloride (PVC), and any combination of any of these. Ethylene vinyl acetate (EVA) copolymer that may be used to produce the padding layers 412, 416 may be obtained as EVAZOTE® foamable EVA resin from BXL Plastics Limited (a division of BP Plastics) of London, England. After being foamed, the EVAZOTE® foamable EVA resin may be further processed to form cross-linked EVA foam, if desired. Details about how to cross-link the EVA foam derived from the EVAZOTE® foamable EVA resin are within the knowledge of those of ordinary skill in the art of polymer cross-linking and may be supplemented by contacting BXL Plastics Limited. PVC-Nitrite that may be used to produce the padding layers 412, 416 may be obtained as ENSOLITE® foamable resin from Ensolite, Inc. of Mishakawa, Ind. Polyethylene that may be used to produce the padding layers 412, 416 may be obtained as ETHAFOAM® foamable resin from Dow Chemical Company of Midland, Mich. After being foamed, the ETHAFOAM® foamable polyethylene resin may be further processed to form cross-linked polyethylene foam, if desired. Details about how to cross-link the polyethylene foam derived from the ETHAFOAM® foamable polyethylene resin are within the knowledge of those of ordinary skill in the art of polymer cross-linking and may be supplemented by contacting Dow Chemical Company. Polyethylene that may be used to produce the padding layers 412, 416 may also be obtained as VOLARA® foamable resin from Sekisui America Corporation of Lawrence, Mass. After being foamed, the VOLARA® foamable polyethylene resin may be further processed to form cross-linked polyethylene foam, if desired. Details about how to cross-link the polyethylene foam derived from the VOLARA® foamable polyethylene resin are within the knowledge of those of ordinary skill in the art of polymer cross-linking and may be supplemented by contacting Sekisui America Corporation.

The padding layers 412, 416 may be formed as the open cell or closed cell plastic foam, and thereafter applied to any of the impact absorbing composites 10, 110, 210, or 310 using any of the lamination techniques that are known to those of ordinary skill in the art of lamination, such as direct flame lamination or adhesive-based lamination. Alternatively, any of the impact absorbing composites 10, 110, 210, or 310 may be first dipped in a liquid mixture of an appropriate foaming agent and a foamable polymeric resin and thereafter placed in an environment conducive to rising and foaming of the foamable polymeric resin. As an alternative to dipping in the foaming agent and the foamable polymeric resin, any of the impact absorbing composites 10, 110, 210, or 310 may be sprayed with a catalyzed foaming polymer and thereafter placed in an environment that support foaming of the catalyzed foaming polymer.

Figure 11:
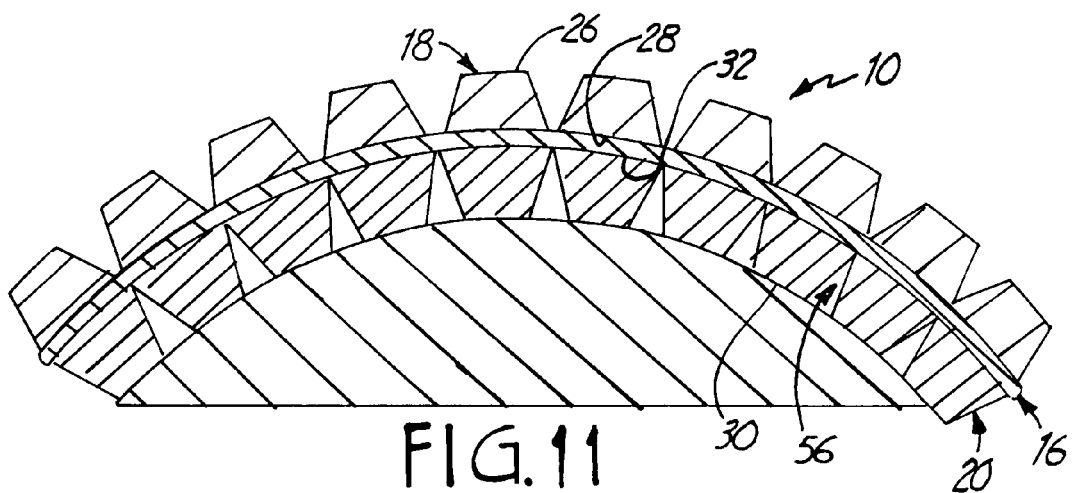
FIG. 11 is another cross-sectional view of the impact absorbing composite of FIG. 1 depicting conformance of the impact absorbing composite to a convex three-dimensional surface.

The impact absorbing composite 10 may be placed against a three-dimensional, convex surface to be protected, as best depicted at 56 in FIG. 11, such as the surface of a person's head, to protect the convex surface 56 and prevent the convex surface 56 from feeling some or all of an impact that is applied against one or more exterior walls 26 of impact absorbing members 18 of the impact absorbing composite 10. The preferred flexibility, elasticity and elongation properties of the flexible substrate layer 16, coupled with the ability of the separate and distinct absorbing members 18 to each move independently with respect to each other and the ability of the separate and distinct impact members 20 to move independently of each other, allows the exterior walls 30 of each impact absorbing member 20 to come into contact with the convex surface 56. Consequently, the impact absorbing composite 10 is fully capable of conforming to the convex surface 56.

Here, it is important to note that this conformance capability of the impact absorbing composite 10 requires that the distance G (not shown in FIG. 11) between exterior walls 30 of adjacent impact absorbing members 20 be selected to prevent any of the adjacent impact absorbing members 20 from restricting independent movement of adjacent impact absorbing members 20 prior to full conformance of the impact absorbing composite 10 with the convex surface 56. On the other hand, minimization of the distance F (not shown in FIG. 11) between interior walls 32 of adjacent impact absorbing members 20 and minimization of the distance D (not shown in FIG. 11) between interior walls 28 of adjacent impact absorbing members 18 does not restrict conformance of the impact absorbing composite 10 to the convex surface 56.

Instead, minimization of the distances D, F maintains close placement of the impact absorbing members 18 relative to each other proximate the flexible substrate layer 16 and close placement of the impact absorbing members 20 relative to each other proximate the flexible substrate layer 16. Consequently, minimization of the distances D, F tends to maximize impact absorption properties and tends to minimize impact penetration opportunities to the convex surface 56. Likewise, when the exterior walls 30 of the impact absorbing members 20 are to be placed against the convex surface 56, there is no need to enhance or even provide any spacing E between exterior walls 26 of adjacent impact absorbing members 18, since the exterior walls 26 of adjacent impact absorbing members 18 tend to move apart from each other upon positioning of the exterior walls 30 of the impact absorbing members 20 against the convex surface 56.

Figure 12:
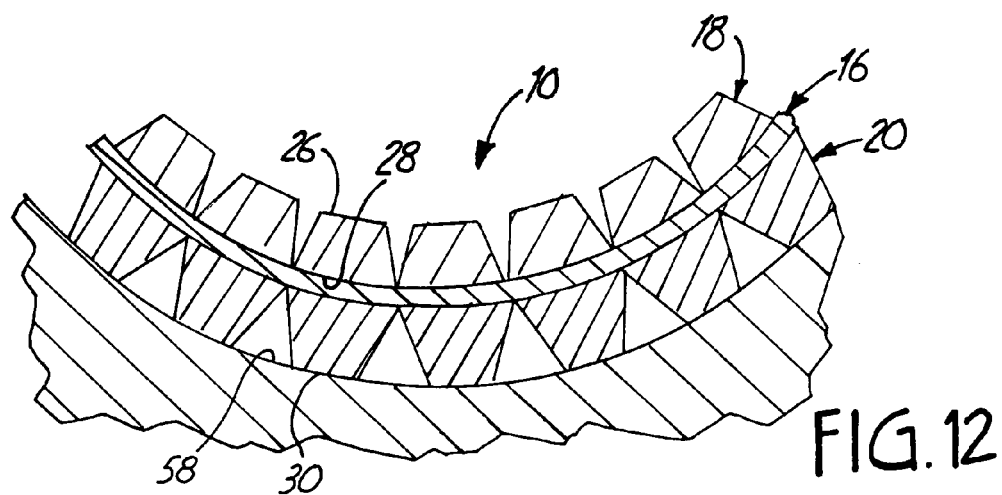
FIG. 12 is another cross-sectional view of the impact absorbing composite of FIG. 1 depicting conformance of the impact absorbing composite to a concave three-dimensional surface.

As another alternative, the impact absorbing composite 10 may be placed against a three-dimensional, concave surface to be protected, as best depicted at 58 in FIG. 12, such as the front portion of a person's ankle, to protect the convex surface 58 and prevent the convex surface 58 from feeling some or all of an impact that is applied against one or more exterior walls 26 of impact absorbing members 18 of the impact absorbing composite 10. The preferred flexibility, elasticity and elongation properties of the flexible substrate layer 16, coupled with the ability of the separate and distinct absorbing members 18 to each move independently with respect to each other and the ability of the separate and distinct impact members 20 to move independently of each other allows the exterior walls 30 of each impact absorbing member 20 to come into contact with the concave surface 58. Consequently, the impact absorbing composite 10 is fully capable of conforming to the concave surface 56.

Here, it is important to note that this conformance capability of the impact absorbing composite 10 requires that the distance E (not shown in FIG. 12) between exterior walls 26 of adjacent impact absorbing members 18 be selected to prevent any of the adjacent impact absorbing members 18 from restricting independent movement of adjacent impact absorbing members 18 prior to full conformance of the impact absorbing composite 10 with the concave surface 58.

On the other hand, minimization of the distance F (not shown in FIG. 12) between interior walls 32 of adjacent impact absorbing members 20 and minimization of the distance D (not shown in FIG. 12) between interior walls 28 of adjacent impact absorbing members 18 does not restrict conformance of the impact absorbing composite 10 to the concave surface 58.

Instead, minimization of the distances D, F maintains close placement of the impact absorbing members 18 relative to each other proximate the flexible substrate layer 16 and close placement of the impact absorbing members 20 relative to each other proximate the flexible substrate layer 16. Consequently, minimization of the distances D, F tends to maximize impact absorption properties and tends to minimize impact penetration opportunities to the concave surface 58. Likewise, when the exterior walls 30 of the impact absorbing members 20 are to be placed against the concave surface 58, there is no need to enhance or even provide any spacing G between exterior walls 30 of adjacent impact absorbing members 20, since the exterior walls 30 of adjacent impact absorbing members 20 tend to move apart from each other upon positioning of the exterior walls 30 of the impact absorbing members 20 against the concave surface 58.

Figure 13:
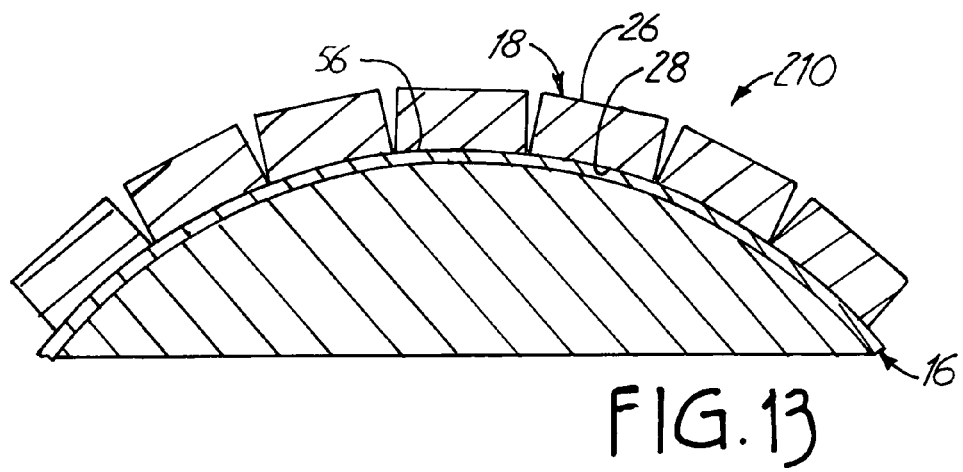
FIG. 13 is a cross-sectional view of another impact absorbing composite depicting conformance of the impact absorbing composite to a convex three-dimensional surface.

As yet another example, the impact absorbing composite 210 may be placed against the three-dimensional, convex surface 56, as best depicted in FIG. 13, to protect the convex surface 56 and prevent the convex surface 56 from feeling some or all of an impact that is applied against one or more exterior walls 26 of impact absorbing members 18 of the impact absorbing composite 210. The preferred flexibility, elasticity and elongation properties of the flexible substrate layer 16, coupled with the ability of the separate and distinct absorbing members 18 to each move independently with respect to each other allows the flexible substrate layer 16 to come fully into contact with the convex surface 56. Consequently, the impact absorbing composite 210 is fully capable of conforming to the convex surface 56.

Here, it is interesting to note that minimization of the distance D (not shown in FIG. 13) between interior walls 28 of adjacent impact absorbing members 18 does not restrict conformance of the impact absorbing composite 210 to the convex surface 56. Instead, minimization of the distance D maintains close placement of the impact absorbing members 18 relative to each other proximate the flexible substrate layer 16. Consequently, minimization of the distance D tends to maximize impact absorption properties and tends to minimize impact penetration opportunities to the convex surface 56.

Figure 14:
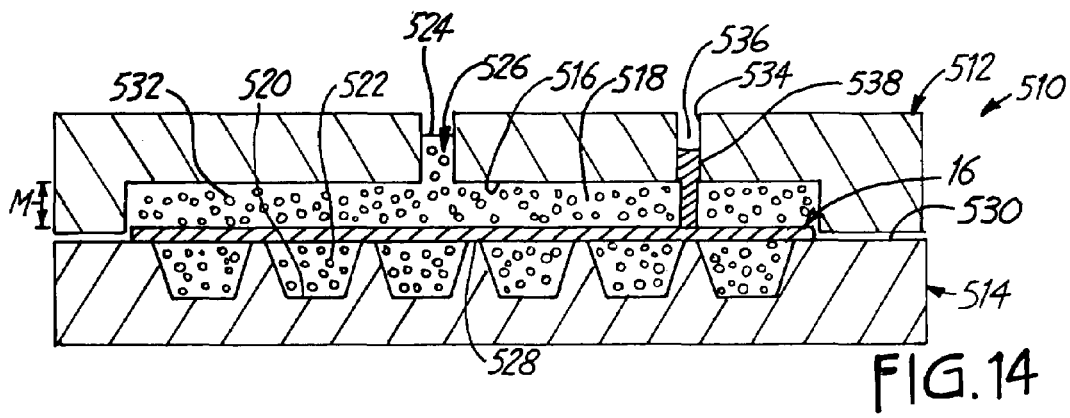
FIG. 14 is a cross-sectional view of a mold that may be used to form the impact absorbing composite of the present invention.

As previously explained, the impact absorbing composite 10 may be manufactured by attaching the impact absorbing members 18 to the flexible substrate layer 16 with the first adhesive layer (not shown), and the impact absorbing members 20 may be attached to the flexible substrate layer 16 with the second adhesive layer (not shown). However, the impact absorbing composite 10 is preferably formed to include the impact absorbing member 36 and the flexible substrate layer 16, where the flexible substrate layer 16 passes through, is integral with, and is bonded within the impact absorbing members 36. To achieve this result, the impact absorbing composite 10 may be manufactured via a novel molding and machining technique where the machining technique employs a mold, as best depicted at 510 in FIG. 14.

The mold 510 includes a first mold half 512 and a second mold half 514. The first mold half 512 includes a plurality of internal surfaces 516 that collectively define a cavity 518 within the mold half 512. Also, the second mold half 514 includes a plurality of internal surfaces 520 that collectively define a plurality of cavities 522 of the second mold half 514. Each mold cavity 522 may be used to form individual impact absorbing members 18 or individual impact absorbing members 20. When the cavities 522 are used to form the impact absorbing members 20, the cavity 518 is used to form an intermediate of the impact absorbing members 18, and a thickness M of the cavity 18 is set at approximately two times the thickness D (not shown in FIG. 14) of the impact absorbing members 18. Alternatively, when the cavities 522 are used to form the impact absorbing members 18, the cavity 518 is used to form an intermediate of the impact absorbing members 20, and the thickness M of the cavity 518 is set at about two times the thickness B (not shown in FIG. 14) of the impact absorbing members 20. In addition to the mold cavity 518, the first mold half 512 additionally includes a radial internal surface 524 that defines a sprue 526. The sprue 526 connects a source (not shown) of unexpanded resin beads to the mold cavity 518 and consequently also to the mold cavities 522.

The second mold half 514 includes a plurality of bridging surfaces 528 between each adjacent mold cavity 422 and additionally includes an internal sealing surface 530 that is located exterior to the mold cavities 522. Prior to engaging the first mold half 512 against the second mold half 514, the flexible substrate layer 16 is positioned on the bridging surfaces 528 and the internal sealing surface 530 and consequently covers each of the mold cavities 522. After positioning the flexible substrate layer 16, the first mold half 512 and the second mold half 514 are brought into engagement with each other. Thereafter, after the mold 510 is closed, unexpanded resin beads 532 may be introduced through the sprue 526 and allowed to fall through the pores or spaces of the flexible substrate layer 16 into the cavities 522. Also, unexpanded resin beads 532 not falling into the cavities 522 will be retained in the cavity 518.

If desired, a plurality of the sprues 526 may be included in the first mold half 512 to enhance uniformity of unexpanded resin bead 532 distribution between the different mold cavities 522. Also, though not believed necessary, the mold half 512 may include one or more internal radial surfaces 534 that define one or more bores 536 and may additionally include one or more support fingers 538, where one support finger 538 retractably fits within each bore 536. Prior to filling the mold cavities 518, 522, the finger(s) 538 may be protracted into contact with the flexible substrate layer 16 to hold the flexible substrate layer 16 between each support finger 538 and each bridging surface 528 that is in registry with the respective support finger 538. Again, these fingers 538 are optional, since it is believed the flexible substrate layer 16 will remain appropriately positioned within the mold 510 during introduction of the unexpanded resin beads 532 into the mold 510. However, if it is determined that the flexible substrate layer 16 shifts within the mold 510 prior to expansion of the unexpanded resin beads 532, it is permissible to include the finger(s) 538 for purposes of securing the flexible substrate layer 16 within the mold 510.

After introduction of the unexpanded resin beads 532 into the mold 510 has been completed, any suitable retraction mechanism may be employed to retract the support finger(s) 538 back into the body 10 of the mold 510 to position the finger(s) 538 flush with the surfaces 516 that define the mold cavity 518 within the first mold half 512. It is also important to note that the pores, spaces, or holes through the flexible substrate layer 16 should be large enough to accept and allow passage of the unexpanded resin beads 532. Consequently, as previously explained, the pores, spaces, or holes through the flexible substrate layer 16 should generally have a cross-sectional diameter or width dimension of at least about 3 millimeters (about 0.12 inch), preferably at least about 5 millimeters (about 0.2 inch), and more preferably at least about 6.4 millimeters (about 0.25 inch) allow free passage of the unexpanded resin beads 532 without clogging at the pores, spaces, or holes of the layer 16.

Figure 15:
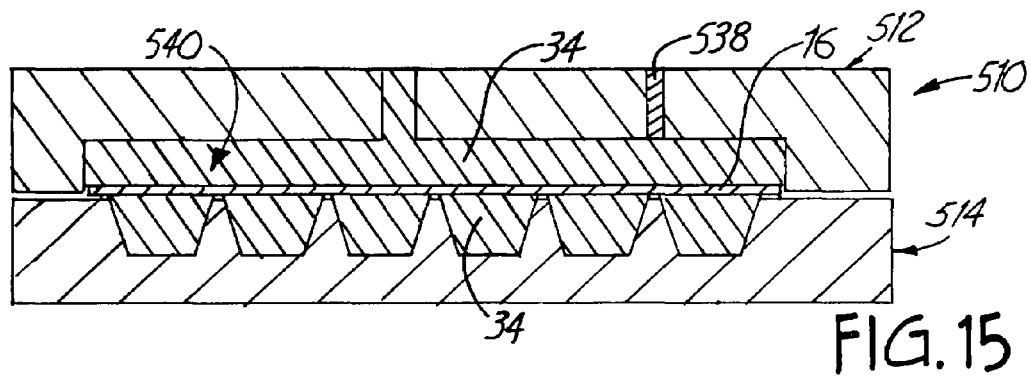
FIG. 15 is another cross-sectional view of the mold of FIG. 14 that depicts an intermediate of the impact absorbing composite within the mold.

After introduction of the unexpanded resin beads 532 into the cavities 518, 522 has been completed, the unexpanded resin beads 532 are placed under appropriate pressure and temperature conditions for the particular unexpanded resin beads 532 (not shown in FIG. 15) that are employed to create expanded closed cell polymer foam as the material 34 within the mold cavities 518, 522, as best depicted in FIG. 15. The expansion conditions may be varied in accordance with instructions provided by the manufacturer of the unexpanded resin beads 532 to provide the material 34 with a desired density and, consequently, a desired level of rigidity and impact absorption capabilities. Techniques and conditions for expanding unexpanded resin beads 532 to form the expanded closed cell polymeric foam as the material 34 are well within the abilities of those of ordinary skill in the art and will also necessarily reflect the particular resin beads 532 that are employed along with the desired density of the material 34 and consequently the desired rigidity and impact absorption properties of the material 34.

After expansion of the unexpanded resin beads 532 to form the material 34, an intermediate 540 of the impact absorbing composite 10 remains in the mold 510. In addition to filling the cavities 518, 522, the material 34 also impregnates the pores or holes of the flexible substrate layer 16. Consequently, due to the adhesive nature of expanded polymeric foam, the material 34 in the cavity 518 along with the material 34 in the cavities 522 is bonded to the material 34 that remains within the pores or holes of the flexible substrate layer 16. Thus, the flexible substrate layer 16 is impregnated within the intermediate 540 of the impact absorbing composite 10.

After appropriate cooling of the intermediate 540 of the impact absorbing composite 10, where the cooling duration and conditions for the material 34 in the form of the expanded closed cell polymeric foam are well within the ability of those of ordinary skill in the art, the mold halves 512, 514 are opened and the intermediate 540 of the impact absorbing composite 10 is removed from the mold 510. Next, there are at least a couple of different options for removing excess material 34 from the intermediate 540 to form the impact absorbing composite 10. All subsequent discussions are based upon formation of the impact absorbing members 20 in the mold cavities 522. In the event that one desires instead to form the impact absorbing members 18 in the cavities 522, all subsequent discussions about removal of excess material 34 to form the impact absorbing members 18 are to be understood as equally applying to removal of excess material 34 to form the impact absorbing members 20.

Figure 16:
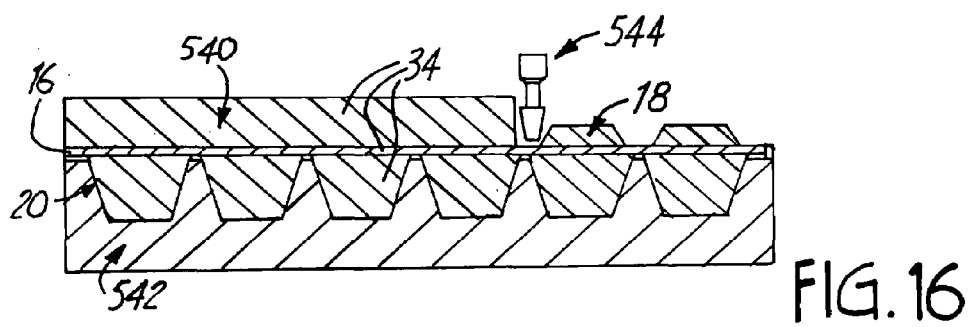
FIG. 16 is a cross-sectional of the intermediate of the impact absorbing composite of FIG. 15 depicting milling of the intermediate of the impact absorbing composite.

One option for removing excess material 34 from the intermediate 540 entails placement of the impact absorbing members 20 in a jig 542 to secure the impact absorbing composite 10, as best depicted in FIG. 16. After the impact absorbing composite 10 is secure with the jig 542, a milling head 544, similar to a router bit, may be employed to mechanically cut through and remove excess material 34 to leave the impact absorbing members 18. The milling head 544 removes an appropriate amount of material 34 to provide the impact absorbing members 18 with the previously described dimensions and configuration and to position the impact absorbing members 18 in registration with respective impact absorbing members 20. The milling head 544 may be manually manipulated, but is preferably controlled by a numerically controlled machine or similar computer-controlled machinery to enhance the speed and accuracy of material 34 removal.

Figure 17:
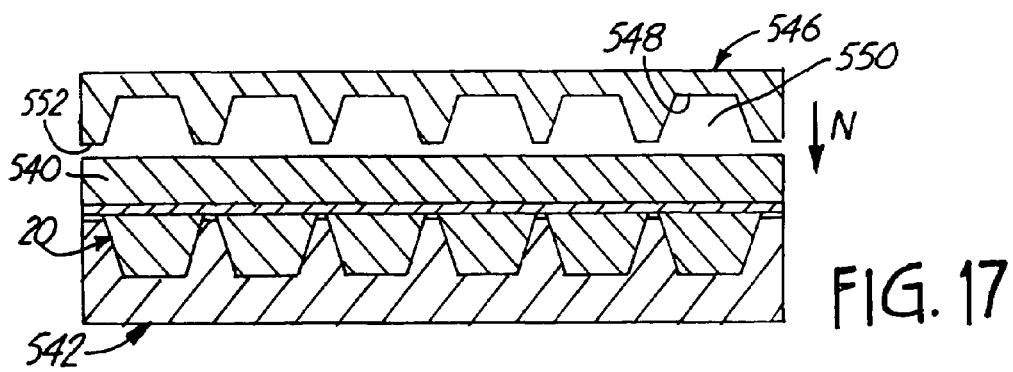
FIG. 17 is a cross-sectional view of the intermediate of the impact absorbing composite of FIG. 15 depicting an alternative technique for transforming the intermediate of the impact absorbing composite into the impact absorbing composite.

As an alternative to the milling head 544 and mechanic removal of excess material 34, a heated die or platen may be employed, as best depicted at 546 in FIG. 17, to remove excess material 34. Prior to use of the heated platen 546, the intermediate 540 of the impact absorbing composite 10 is secured within the jig 542. The heated platen 546 includes a plurality of internal surfaces 548 that each define cavities 550 in the heated platen 546. When the excess material 34 is being removed to form the impact absorbing members 18, the cavities 550 have the shape, size, and configuration selected for the particular impact absorbing members 18. When the excess material 34 is being removed to form the impact absorbing members 20, the cavities 550 have the shape, size, and configuration selected for the impact absorbing members 20. The platen 546 is heated to a temperature that is adequate to vaporize any of the material 34 to be removed from the intermediate 540 of the impact absorbing composite 10. Upon appropriate heating of the platen 546, the heated platen 546 is moved in the direction of arrow N toward the intermediate 540. The heated platen 546 is moved in the direction of arrow N and into contact with the intermediate 540, and excess material 34 is vaporized until internal perimeter surfaces 552 of the heated platen 546 come into contact with the flexible substrate layer 16, which signals completion of formation of the impact absorbing members 18 by the cavities 550 and surfaces 548 of the heated platen 546.

After transformation of the intermediate 540 into the impact absorbing composite 10, the impact absorbing composite 10 may be further processed to add padding, such as padding layer 412 (see FIG. 10) and/or padding layer 416 (see FIG. 10). Furthermore, the impact absorbing composite 10 may be subjected to additional processes appropriate for particular applications of the impact absorbing composite 10, as described more fully below in relation to certain applications.

The impact absorbing composite of the present invention is a versatile structure that has innumerable application possibilities. Though comments provided herein about applications of the impact absorbing composites are provided primarily in terms of the impact absorbing composite 10, these comments about applications are intended to apply equally to other forms of the inventive impact absorbing composite, such as the impact absorbing composite 110, the impact absorbing composite 210, the impact absorbing composite 310, and any of the impact absorbing composites 10, 110, 210, or 310 that additionally include padding, such as the padding layer 412 and/or the padding layer 416 described previously with respect to the impact absorbing composite 410.

Of course, use of the impact absorbing composite 10 as, or as part of, a flexible impact guard for protection of some or all of the human body or the body of an animal will help prevent injury to the humans or animals from applied impacts. For example, the impact absorbing composite 10 may be incorporated as a liner of a helmet for preventing head injuries, into a chest protector of the type commonly worn by catchers and umpires in baseball, in a shin guard of the type commonly worn by soccer players, and in any of the padding devices commonly worn by football players, such as shoulder pads and thigh pads.

Also, the impact absorbing composite 10 may be incorporated into padding devices for protecting joints, such as the elbow, the knee, and the wrist. Inline skaters, as one example, are commonly encouraged to wear knee-padding, elbow-padding, and wrist-padding. The impact absorbing composite 10 closely conforms to each of these joints, even during repetitive movement of these joints, and consequently provides continuous and enhanced impact protection for these joints. Some additional non-exhaustive examples of personal protection equipment that may be formed of or consist of the impact absorbing composite 10 include bomb suits that are used to protect persons handling bombs from accidental bomb detonation, protective equipment worn by motorcycle riders, and any other personal protection article worn by persons who may conceivably reveal an impact as a result of practicing a particular activity.

Other non-exhaustive examples of applications for the impact-absorbing composite 10 include use of the impact absorbing composite 10 in structural applications. For example, the impact absorbing composite 10 may be used as an impact absorbing underlayer in buildings, such as in floors and walls of buildings. Also, the impact absorbing composite 10 may be employed beneath laboratory equipment and other types of mechanical equipment that are sensitive to vibrations as an anti-vibration layer. As another example, the impact absorbing composite 10 may be incorporated as an inner core component of FRP (fiberglass reinforced plastic) laminates (especially those FRP laminates having a variety of different contours).

Still further, the impact absorbing composite 10 may be incorporated in a variety of different vehicular applications. For example, the impact absorbing composite 10 may be incorporated inside body panels of vehicles as an impact absorbing component. Additionally, the impact absorbing composite 10 may be employed inside vehicles as an impact absorbing covering for vehicle components that a person may conceivably come into contact with, such as a dashboard, a steering wheel, a support post, or a roof, during a collision. Similar applications are envisioned for other vehicle types such as trains, buses and aircraft.

The impact absorbing composite 10 also has a variety of different applications in outside environments. For example, the impact absorbing composite 10 may be positioned on the ground as a ground cover for temporary seating. Also, the impact absorbing composite 10 may be employed in or as a temporary walkway for covering soft or wet ground to permit humans or animals to walk across the soft or wet ground without getting wet or muddy shoes or feet. For these applications, the density of the material 34 may be selected to provide the impact absorption members 18, 20 with a level of buoyancy that will permit the impact absorbing composite 10 to float in water. Thus, in addition to being incorporated in or serving as a temporary walkway for soft or wet ground, the impact absorbing composite 10 may also be employed as a flexible floatation structure, such as a floating bridge across water or as a dock structure. Furthermore, when the flexible substrate layer 16 includes holes or pores, the impact absorbing composite 10 may be employed as a liquid permeable underlayer in drainage applications.

Further applications include use of the impact absorbing composite 10 as protective packaging for storage or shipping of delicate articles. Also, closed cell foams of the type that may be used as the material 34 typically have a low thermal conductivity. Consequently, the impact absorbing composite 10 may be employed as thermal insulation for contoured surfaces that are difficult to cover with thermal insulation materials not having the ability of the impact absorbing composite 10 to closely conform to three-dimensional surfaces. Additionally, the material 34 and the material of the flexible substrate layer 16 may be chosen to have a high degree of electrical conductivity that permits use of the impact absorbing composite 10 as anti-static dissipative matting for electrical equipment. Alternatively, the material 34 and the material of the flexible substrate layer 16 may be chosen to provide the impact absorbing composite 10 with a low degree of electrical conductivity that would support use of the impact absorbing composite 10 as a non-conductive layer for electrical insulation applications.

Although the present invention has been described with reference to preferred embodiments, workers skilled in the art will recognize that changes may be made in form and detail without departing from the spirit and scope of the invention.

What is claimed is:

1. A method of forming an impact absorbing composite, the method comprising:
   placing a flexible layer into a molding apparatus, the molding apparatus having a plurality of first surfaces that define a plurality of first mold cavity portions and a second surface that defines a second mold cavity portion and, the flexible layer positioned between the first mold cavity portions and the second mold cavity portion, and the first mold cavity portions and the second mold cavity portion collectively forming a mold cavity;
   placing polymeric resin in the mold cavity;
   expanding the polymeric resin in the mold cavity to form an impact absorbing composite intermediate, the impact absorbing composite intermediate comprising expanded polymeric resin and the flexible layer; and
   finishing the impact absorbing composite intermediate to form the impact absorbing composite.

2. The method of claim 1 wherein:
   placing polymeric resin in the mold cavity comprises placing the polymeric resin in the first mold cavity portions and the second mold cavity portion; and
   expanding the polymeric resin in the mold cavity comprises expanding the polymeric resin in the first mold cavity portions and expanding the polymeric resin in the second mold cavity portion.

3. The method of claim 2 wherein:
   the flexible layer has a first major surface and a second major surface that are located on opposing sides of the flexible layer and has internal surfaces that define a plurality of holes that extend through the flexible layer from the first major surface to the second major surface; and
   placing polymeric resin in the mold cavity comprises placing the polymeric resin in the second mold cavity portion and allowing the polymeric resin to pass through the holes of the flexible layer and into the first mold cavity portions.

4. The method of claim 2 wherein the flexible layer has internal surfaces that define a plurality of holes in the flexible layer, the method further comprising securing the expanded polymeric resin within the holes of the flexible layer.

5. The method of claim 4 wherein:
   the flexible layer has a first major surface and a second major surface, the first major surface and the second major surface located on opposing sides of the flexible layer; and the holes of the flexible layer extend through the first major surface, through the second major surface, or through both the first major surface and the second major surface.

6. The method of claim 1 wherein the impact absorbing composite intermediate comprises a plurality of first impact absorbing members, the first impact absorbing members formed in the first mold cavity portions, and adjacent first impact absorbing members are discrete and individually distinct from each other.

7. The method of claim 6 wherein:
the flexible layer has internal surfaces that define a plurality of holes in the flexible layer;
the first impact absorbing members comprise the expanded polymeric resin; and
the expanded polymeric resin of the first impact absorbing members extends into and is fixed within the holes of the flexible layer.

8. The method of claim 1 wherein the expanded polymeric resin comprises closed cell polymeric foam.

9. The method of claim 8 wherein the closed cell polymeric foam comprises polymeric material that is selected from the group consisting of polystyrene, polyethylene, polypropylene, and any combination of any of these.

10. The method of claim 1 wherein the impact absorbing composite comprises:
a plurality of first impact absorbing members attached to the flexible layer; and
a plurality of second impact absorbing members attached to the flexible layer, the first impact absorbing members and the second impact absorbing members attached to opposing sides of the flexible layer.

11. The method of claim 10 wherein the first impact absorbing members are free of voids.

12. The method of claim 10 wherein adjacent first impact absorbing members are discrete and individually distinct from each other.

13. The method of claim 10 wherein the first impact absorbing members are movable independently with respect to each other.

14. The method of claim 1 wherein the flexible layer comprises a net or open-meshed fabric.

15. The method of claim 1 wherein:
the impact absorbing composite intermediate comprises a plurality of first impact absorbing members, the first impact absorbing members formed in the first mold cavity portions; and
finishing the impact absorbing composite intermediate comprises:
removing excess expanded polymeric resin to form a plurality of second impact absorbing members, the first impact absorbing members and the second impact absorbing members located on opposing sides of the flexible layer.

16. The method of claim 15 wherein:
removing excess expanded polymeric resin means thermally cutting excess expanded polymeric resin, mechanically cutting or routing excess expanded polymeric resin, vaporizing excess expanded polymeric resin, or any of these in any combination.

17. An impact absorbing composite, the impact absorbing composite comprising:
a plurality of impact absorbing members, each impact absorbing member being solid and predominantly free of voids; and
a flexible layer comprising a net or open-meshed fabric, each impact absorbing member attached to the flexible layer, wherein:
adjacent impact absorbing members are in contact with each other; and
the majority of the impact absorbing members are surrounded by at least three adjacent impact absorbing members.

18. An impact absorbing composite, the impact absorbing composite comprising:
a plurality of first impact absorbing members, the first impact absorbing members being solid and predominantly free of voids;
a plurality of second impact absorbing members attached in working relation with the first impact absorbing members; and
a flexible layer, the first impact absorbing members attached to the flexible layer, wherein:
adjacent first impact absorbing members are in contact with each other; and
the first impact absorbing members and the second impact absorbing members are located on opposite sides of the flexible layer.

19. A method of making an impact absorbing composite, the method comprising:
attaching a plurality of impact absorbing members to a flexible layer that comprises a net or open-meshed fabric, the impact absorbing members being solid and predominantly free of voids;
placing adjacent impact absorbing members in contact with each other, the majority of the impact absorbing members surrounded by at least three adjacent impact absorbing members.

20. A method of making an impact absorbing composite, the method comprising:
attaching a plurality of first impact absorbing members to a flexible layer, the first impact absorbing members being solid and predominantly free of voids and adjacent first impact absorbing members in contact with each other;
attaching a plurality of second impact absorbing members in working relation with the first impact absorbing members, the first impact absorbing members and the second impact absorbing members located on opposite sides of the flexible layer.

21. The method of claim 6 wherein each impact absorbing member is directly attached to, and in contact with, the flexible layer.

22. The method of claim 6 wherein the impact absorbing members and the flexible layer are formed of different materials.

23. The method of claim 10 wherein each first impact absorbing member is directly attached to, and in contact with, the flexible layer.

24. The method of claim 10 wherein the first impact absorbing members and the flexible layer are formed of different materials.

25. The method of claim 10 wherein the flexible layer comprises a net or open-meshed fabric.

26. The impact absorbing composite of claim 17 wherein each impact absorbing member is directly attached to, and in contact with, the flexible layer.

27. The impact absorbing composite of claim 17 wherein the impact absorbing members and the flexible layer are formed of different materials.

28. The impact absorbing composite of claim 18 wherein each first impact absorbing member is attached to, and in contact with, the flexible layer.

29. The impact absorbing composite of claim 18 wherein the first impact absorbing members and the flexible layer are formed of different materials.

30. The impact absorbing composite of claim 18 wherein the flexible layer comprises a net or open-meshed fabric.

31. The method of claim 19 wherein each impact absorbing member is attached to, and in contact with, the flexible layer.

32. The method of claim 19 wherein the impact absorbing members and the flexible layer are formed of different materials.

33. The method of claim 20 wherein each first impact absorbing member is attached to, and in contact with, the flexible layer.

34. The method of claim 20 wherein the first impact absorbing members and the flexible layer are formed of different materials.

35. The method of claim 20 wherein the flexible layer comprises a net or open-meshed fabric.

* * * * *

UNITED STATES PATENT AND TRADEMARK OFFICE
CERTIFICATE OF CORRECTION

PATENT NO. : 6,969,548 B1  Page 1 of 1
APPLICATION NO. : 09/787497
DATED : November 29, 2005
INVENTOR(S) : Andrew A. Goldfine It is certified that error appears in the above-identified patent and that said Letters Patent is hereby corrected as shown below:

TITLE PAGE, ITEM (56) REF. CITED
Column 2, under Patent Number 4,085,176
delete "246/82", insert --264/82--

Signed and Sealed this

Twenty-fifth Day of March, 2008

JON W. DUDAS
*Director of the United States Patent and Trademark Office*